US011490223B2

(12) United States Patent
Kim et al.

(10) Patent No.: US 11,490,223 B2
(45) Date of Patent: Nov. 1, 2022

(54) METHOD AND ELECTRONIC DEVICE FOR PROVIDING NOTIFICATION BASED ON DISTANCE OF REMOTE INPUT DEVICE

(71) Applicant: Samsung Electronics Co., Ltd., Suwon-si (KR)

(72) Inventors: Sangheon Kim, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/212,532

(22) Filed: Mar. 25, 2021

(65) Prior Publication Data
US 2021/0306799 A1 Sep. 30, 2021

(30) Foreign Application Priority Data
Mar. 30, 2020 (KR) .................. 10-2020-0038390

(51) Int. Cl.
*H04W 4/02* (2018.01)
*H04B 1/7163* (2011.01)
*G08B 21/24* (2006.01)

(52) U.S. Cl.
CPC ............ *H04W 4/023* (2013.01); *G08B 21/24* (2013.01); *H04B 1/7163* (2013.01)

(58) Field of Classification Search
None
See application file for complete search history.

(56) References Cited

U.S. PATENT DOCUMENTS 9,602,954 B2 3/2017 Youn et al.
10,219,242 B2 2/2019 Qui et al.
(Continued)

FOREIGN PATENT DOCUMENTS

JP 6782184 B2 11/2020
KR 10-2014-0029560 A 3/2014
(Continued)

OTHER PUBLICATIONS

International Search Report dated Jul. 7, 2021, issued in International Application No. PCT/KR2021/003715.
(Continued)

*Primary Examiner* — Thomas S McCormack
(74) *Attorney, Agent, or Firm* — Jefferson IP Law, LLP

(57) ABSTRACT

An electronic device is provided. The electronic device includes a communication circuit, an antenna, a wireless charging coil, a positioning sensor circuit, and a processor. The communication circuit may connect communication with a remote input device and a wearable device. The antenna may transmit/receive a signal with respect to the remote input device and the wearable device. The wireless charging coil may detect an attachment and detachment of the remote input device and transmit/receive an electromagnetic signal with respect to the remote input device. The positioning sensor circuit may measure a distance to the remote input device. The processor may determine an attachment and detachment of the remote input device, based on the electromagnetic signal, and recognizing the distance to the remote input device. The processor may provide the wearable device with a remote notification signal based on the distance to the remote input device.

18 Claims, 19 Drawing Sheets

(56) References Cited

U.S. PATENT DOCUMENTS

| | | |
|---|---|---|
| 2016/0301791 A1 | 10/2016 | Kim et al. |
| 2018/0092145 A1 | 3/2018 | Kapoor et al. |
| 2019/0028997 A1 | 1/2019 | Inoue et al. |
| 2019/0278390 A1* | 9/2019 | Chiang ................ G06F 1/1607 |
| 2022/0078354 A1 | 3/2022 | Lee et al. |

FOREIGN PATENT DOCUMENTS

| | | |
|---|---|---|
| KR | 10-2016-0066951 A | 6/2016 |
| KR | 10-2017-0090295 A | 8/2017 |
| KR | 10-2020-0024028 A | 3/2020 |

OTHER PUBLICATIONS

Written Opinion dated Jul. 7, 2021, issued in International Application No. PCT/KR2021/003715.

* cited by examiner

830

| Length (1byte) | AD Type: Flags (1byte) | Flag Data (1byte) | Length (1byte) | AD Type: Manufacturer Data (1byte) | Company ID (2byte) | Version (1byte) | Service ID (1byte) | Service SpecificData (N byte) |
|---|---|---|---|---|---|---|---|---|
| 0x02 | 0x01 | 0x1A | Variable | 0xFF | 0x0075 | 0x01 | 0xaa | Variable |

FIG.9C

METHOD AND ELECTRONIC DEVICE FOR PROVIDING NOTIFICATION BASED ON DISTANCE OF REMOTE INPUT DEVICE

CROSS-REFERENCE TO RELATED APPLICATION(S)

This application is based on and claims priority under 35 U.S.C. § 119(a) of a Korean patent application number 10-2020-0038390, filed on Mar. 30, 2020, in the Korean Intellectual Property Office, the disclosure of which is incorporated by reference herein in its entirety.

BACKGROUND

1. Field

The disclosure relates to a method and electronic device for providing a user with a notification based on a distance of a remote input device (e.g., a stylus) by using a wearable device.

2. Description of the Related Art

A remote input device (e.g., a stylus) may be coupled to an electronic device (e.g., a smartphone), based on a compatible short-range wireless communication standard (e.g., Bluetooth/Wi-Fi). A wireless communication distance in which the electronic device and the remote input device can be coupled may vary depending on the short-range wireless communication standard. The remote input device (e.g., the stylus) compatible with the Bluetooth communication standard may provide a wireless communication distance within about 10 m. The remote input device compatible with the Wi-Fi communication standard may provide a wireless communication distance within about 100 m.

The above information is presented as background information only to assist with an understanding of the disclosure. No determination has been made, and no assertion is made, as to whether any of the above might be applicable as prior art with regard to the disclosure.

SUMMARY

A typical remote input device may not include output elements (e.g., a speaker, a vibration motor, a display, or a Light Emitting Diode (LED)) capable of providing a direct notification to a user due to a limited mounting space. For example, a remote input device such as a stylus may include input elements such as a pen tip sensor, a button input device, and/or a motion sensor. Accordingly, the electronic device may process a remote control input (e.g., an air action) for a remote input device wirelessly connected, and may provide a notification (e.g., displaying of a remote control execution screen and an effect image).

Since the remote input device (e.g., the stylus) does not have output elements capable of providing direct notification, the notification can be provided only through an output element (e.g., a display or a speaker) of the wirelessly connected electronic device. For example, when the remote input device is spaced apart by more than a maximum wireless communication distance (e.g., a communication distance of 10 m) from the electronic device, the remote input device may directly provide a wireless communication disconnection notification to a user. In addition, since the user is spaced apart by the maximum wireless communication distance, it may be difficult to visually identify a notification (e.g., a control success message) through the electronic device when a remote control input occurs.

Aspects of the disclosure are to address at least the above-mentioned problems and/or disadvantages and to provide at least the advantages described below. Accordingly, an aspect of the disclosure is to provide an occurrence of a notification (e.g., a feedback for a wireless communication disconnection notification or a control input) of a remote input device (e.g., a stylus) not having output elements to a user.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit, an antenna, a wireless charging coil, a positioning sensor circuit, and a processor. The communication circuit is configured to communicate with a remote input device and a wearable device. The antenna is configured to transmit and receive a signal with respect to the remote input device and the wearable device. The wireless charging coil is configured to detect an attachment and detachment of the remote input device and transmit/receive an electromagnetic signal with respect to the remote input device. The positioning sensor circuit is configured to measure a distance to the remote input device. The processor is configured to determine an attachment and detachment of the remote input device, based on the electromagnetic signal, recognize the distance to the remote input device, and provide the wearable device with a remote notification signal based on the distance to the remote input device.

The processor of the electronic device may determine whether the wearable device is in a worn state, if the distance to the remote input device exceeds a pre-set threshold distance, and may activate a remote notification using the wearable device, if the wearable device is in the worn state.

The electronic device may include a display, and may display a notification control interface through the display in response to a separation state of the remote input device.

The electronic device may display a list of wearable devices wirelessly coupled through the notification control interface. Wearing detection sensor data of the wearable devices may be received to display the wearable device capable of remote notification.

The electronic device may display a notification control interface to notify that the distance exceeds the threshold distance, if the distance to the remote input device exceeds the pre-set threshold distance.

The electronic device may include one or more cameras capturing an image by using the remote input device to generate an image signal. The processor may analyze the image signal to measure the distance to the remote input device, and recognize a motion of the remote input device.

The electronic device may determine that the remote input device is located within the threshold distance if the remote input device is identified as a result of analyzing the image signal. It may be determined that the remote input device is out of the threshold distance if the remote input device is not identified.

The electronic device may deactivate the remote notification using the wearable device, if the remote input device is located within a pre-set threshold distance.

The electronic device may further include an infrared sensor emitting an infrared ray. The infrared ray reflected from the remote input device may be received to measure a distance to the remote input device.

The electronic device may further include an ultrasonic sensor emitting an ultrasonic wave. The ultrasonic wave reflected from the remote input device may be received to measure a distance to the remote input device.

The electronic device may further include a Radio Frequency (RF) input/output unit which outputs an Ultra-Wide Band (UWB) signal. The UWB signal reflected from the remote input device may be received to measure a distance to the remote input device.

In accordance with another aspect of the disclosure, a method of operating an electronic device and providing a notification, based on a distance of a remote input device, is provided. The method include establishing a communication with the remote input device and a wearable device, transmitting/receiving an electromagnetic signal with respect to the remote input device, detecting an attachment and detachment of the remote input device based on the electromagnetic signal, measuring a distance to the remote input device, and providing the wearable device with a remote notification signal based on the distance to the remote input device.

The method of providing the notification based on the distance to the remote input device may include determining whether the wearable device is in a worn state, if the distance to the remote input device exceeds a pre-set threshold distance. A remote notification using the wearable device may be activated if the wearable device is in the worn state.

The method of providing the notification based on the distance to the remote input device may include displaying a notification control interface through a display of the electronic device in response to a separation state of the remote input device. A list of wearable devices wirelessly coupled may be displayed through the notification control interface. Wearing detection sensor data of the wearable devices may be received to display the wearable device capable of remote notification.

The method of providing the notification based on the distance to the remote input device may include displaying a notification control interface to notify that the distance exceeds the threshold distance, if the distance to the remote input device exceeds the pre-set threshold distance.

The method of providing the notification based on the distance to the remote input device may include capturing an image by using the remote input device to generate an image signal. The image signal may be analyzed to measure the distance to the remote input device and recognize a motion of the remote input device.

The method of providing the notification based on the distance to the remote input device may include determining that the remote input device is located within the threshold distance if the remote input device is identified as a result of analyzing the image signal. It may be determined that the remote input device is out of the threshold distance if the remote input device is not identified.

In the method of providing the notification based on the distance to the remote input device, the notification control information may include a notification message, remote interaction information, interaction guide information, recognition success information on the remote control input, recognition failure information on the remote control input, recognized remote control input information, and indicator information corresponding to the recognized remote control input.

In the method of providing the notification based on the distance to the remote input device, the electronic device may provide a remote control input mode for application execution.

In the method of providing the notification based on the distance to the remote input device, the electronic device may provide the remote coordinate control mode corresponding to motion data received from the remote input device.

The method of providing the notification based on the distance to the remote input device may use the wearable device to display the remotely selectable object and provide a haptic vibration, if a mouse cursor is located on a remotely selectable object in the remote coordinate control mode.

Another aspect of the disclosure is to provide a method and electronic device for providing a user with a notification based on a distance of a remote input device (e.g., a stylus) by using a wearable device.

A user feedback may be provided for a remote control input of a remote input device (e.g., a stylus). As another example, a notification may be provided through a wearable device which is worn. As another example, a persistent remote control may be achieved, by guiding the remote input device (e.g., a stylus) to be located within a communicable distance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9C illustrates an advertising packet according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
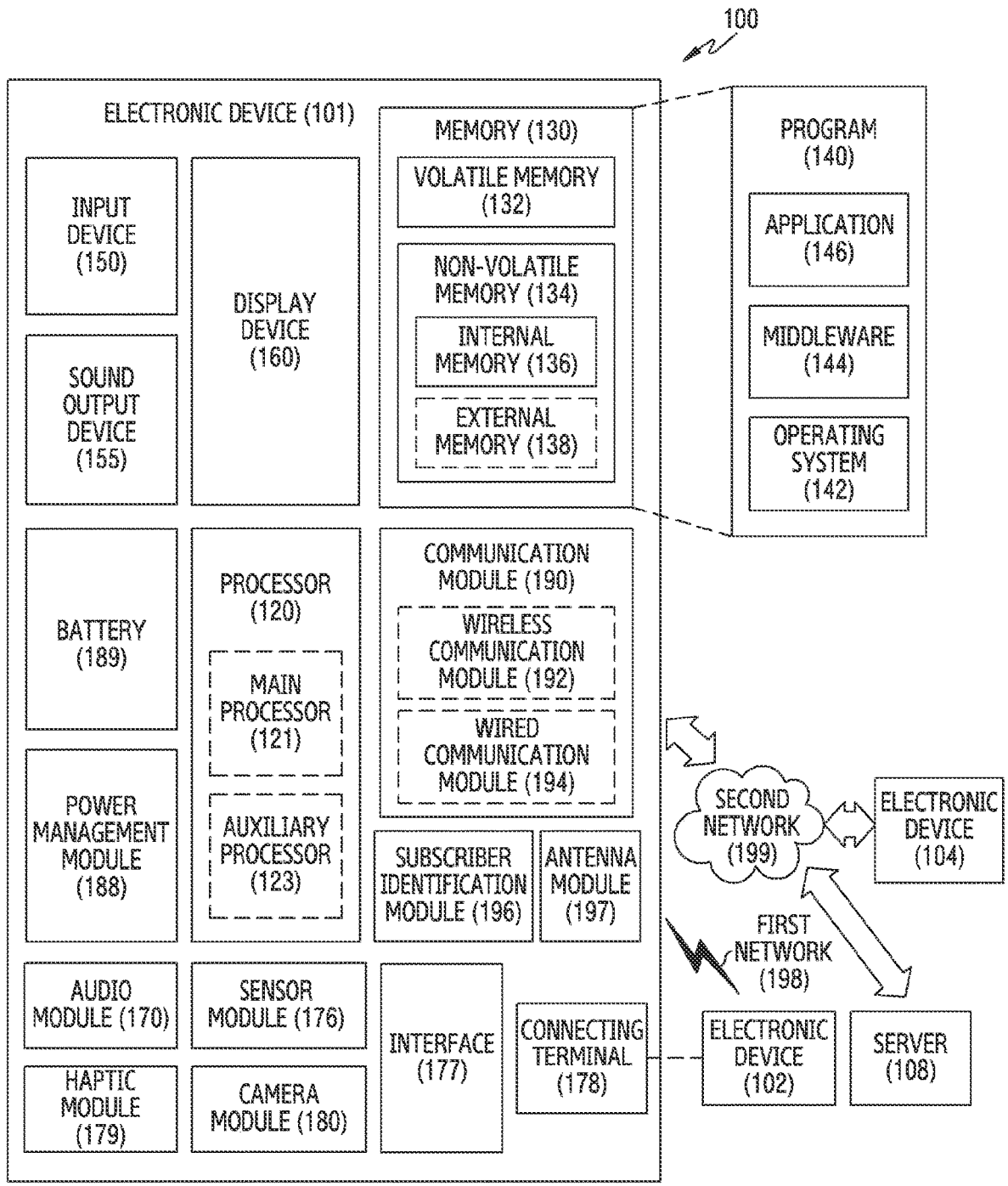
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. At least one of the components (e.g., the display device 160 or the camera module 180) may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, software (e.g., the program 140) and input data or output data for a command related thereto. The memory 130 may include the volatile memory 132 or the non-volatile memory 134.

The program 140 may be stored in the memory 130 as software, and may include, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include a microphone, a mouse, a keyboard, or a digital pen (e.g., a stylus).

The sound output device 155 may output sound signals to the outside of the electronic device 101. The sound output device 155 may include a speaker or a receiver. The speaker may be used for general purposes, such as playing multimedia or playing record, and the receiver may be used for an incoming calls. The receiver may be implemented as separate from, or as part of, the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication.

The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., Printed Circuit Board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. A component other than the radiating element, such as a radio frequency integrated circuit (RFIC), may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of the operations executed by the electronic device 101 may instead be executed by one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments of the disclosure as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" means that the storage medium is a tangible device, and does not include a signal (e.g., an electromagnetic wave), but this term does not differentiate between cases where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
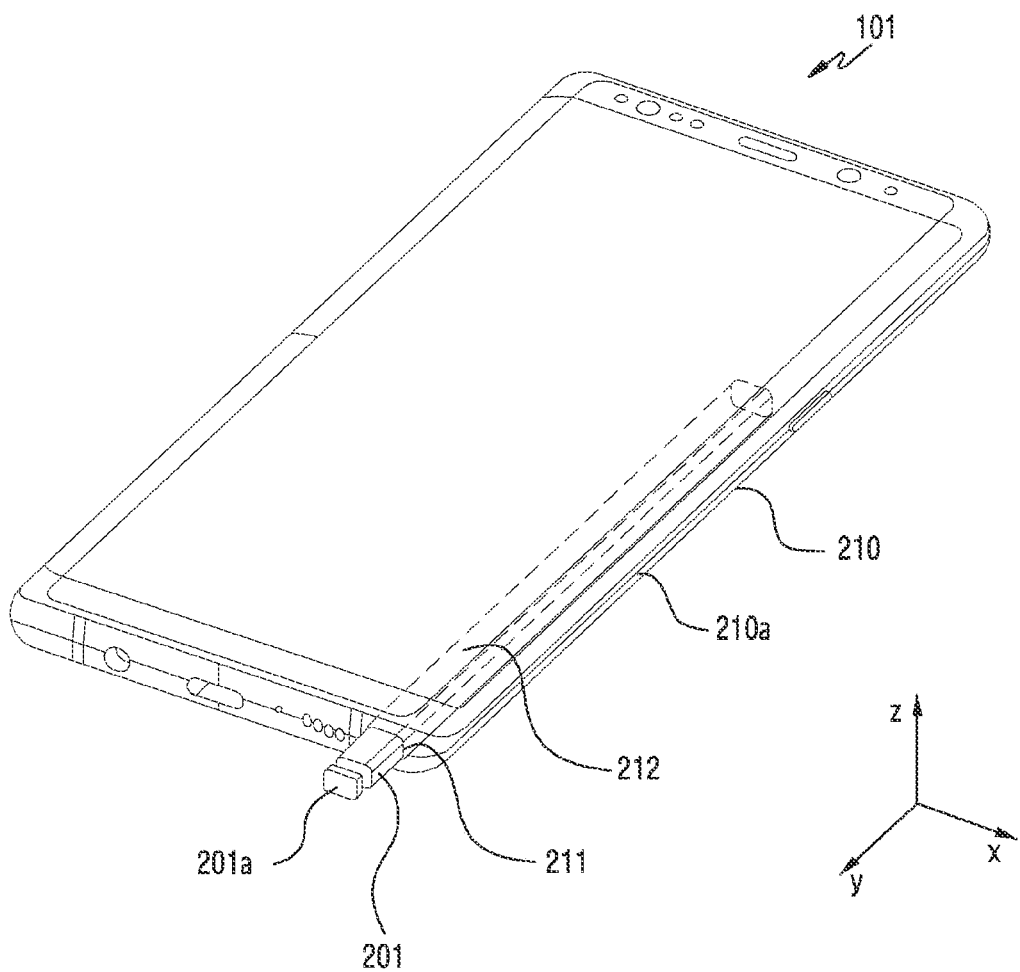
FIG. 2 is a perspective view of an electronic device including a stylus pen, according to an embodiment of the disclosure.

FIG. 2 is a perspective view of an electronic device including a stylus pen, according to an embodiment of the disclosure.

Referring to FIG. 2, the stylus pen 201 in various embodiments of the disclosure may correspond to the input device 150 of FIG. 1. The electronic device 101 may include a structure capable of inserting the stylus pen 201. The stylus pen 201 may correspond to the input device 150 or electronic device 102 of FIG. 1. The electronic device 101 may include a housing 210. A hole 211 may be included in a portion of the housing 210; for example, as shown in FIG. 2, the hole 211 may be included in a portion of a side face 210a. The electronic device 101 may include a first inner space 212, which is an accommodating space coupled to the hole 211, and the stylus pen 201 may be inserted into the first inner space 212. As shown in FIG. 2, the stylus pen 201 may include a first button 201a which can be pressed at one end so that the stylus pen 201 can be easily removed from the first inner space 212 of the electronic device 101. When the first button 201a is pressed, a repulsion mechanism configured in association with the first button 201a operates to remove the stylus pen 201 from the first inner space 212. The repulsion mechanism may be a repulsion mechanism based on at least one elastic member, such as a spring.

Figure 3:
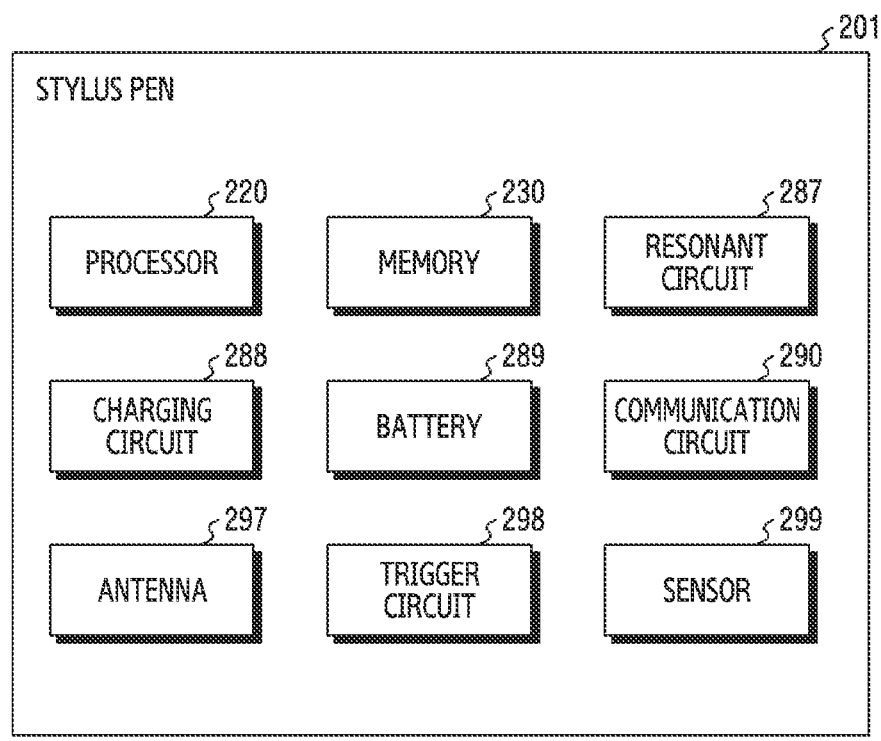
FIG. 3 is a block diagram illustrating a stylus pen according to an embodiment of the disclosure.

FIG. 3 is a block diagram illustrating a stylus pen (e.g., the stylus pen 201 of FIG. 2) according to an embodiment of the disclosure.

Referring to FIG. 3, the stylus pen 201 may include a processor 220, a memory 230, a resonant circuit 287, a charging circuit 288, a battery 289, a communication circuit 290, an antenna 297, a trigger circuit 298, and/or a sensor 299. The processor 220 of the stylus pen 201, at least part of the resonant circuit 287, and/or at least part of the communication circuit 290 may be constructed on a Printed Circuit Board (PCB) or in the form of a chip. At least one of the processor 220, the resonant circuit 287, and the communication circuit 290 may be electrically coupled with the memory 230, the charging circuit 288, the battery 289, the antenna 297, the trigger circuit 298, and/or the sensor 299.

The processor 220 may include a generic processor configured to execute a customized hardware module or software (e.g., an application program). The processor 220 may include a software element (program) (not shown) or a hardware component (function) operatively coupled with at least one of the sensor 299 disposed to the stylus pen 201, a data measurement module (not shown), an input/output interface (e.g., a button 337 of FIG. 4), a module (not shown) for managing a state or environment of the stylus pen 201, and a communication module (e.g., the communication circuit 290). The processor 220 may include one or a combination of two or more of hardware, software, or firmware. The processor 220 may be configured to transmit information indicating a pressed state of a button (e.g., the button 337 of FIG. 4), sensing information acquired by the sensor 299, and/or information (e.g., information related to a location of the stylus pen 201) calculated based on the sensing information to the electronic device 101 through the communication circuit 290.

The memory 230 may store information related to an operation of the stylus pen 201. For example, the information may include information for communication with the electronic device 101 and frequency information related to an input operation of the stylus pen 201. In addition, the memory 230 may store a program (or an application, an algorithm, or a processing loop) for calculating information (e.g., coordinate information and/or displacement information) regarding a location of the stylus pen 201 from sensing data of the sensor 299. The memory 230 may also store a communication stack of the communication circuit 290. The communication circuit 290 and/or the processor 220 may include a dedicated memory.

The resonant circuit 287 may resonate based on an electromagnetic field signal generated from a digitizer (e.g., the display device 160) of the electronic device 101, and may radiate an Electro-Magnetic Resonance (EMR) input signal (or a magnetic field) depending on the resonance. The electronic device 101 may identify a location of the stylus pen 201 on the electron device 101 by using the EMR input signal. For example, the electronic device 101 may identify the location of the stylus pen 201, based on a magnitude of induced electromotive force (e.g., output current) generated by the EMR input signal at each of a plurality of channels (e.g., a plurality of loop coils) in the digitizer. Although the electronic device 101 and the stylus pen 201 are described above as operating based on an EMR scheme, the electronic device 101 may also generate a signal based on an electric field according to an Electrically Coupled Resonance (ECR) scheme. The resonant circuit 287 of the stylus pen 201 may resonate based on the electric field. The electronic device 101 may identify an electric potential at a plurality of channels (e.g., electrodes) based on the resonance at the stylus pen 201, and may identify the location of the stylus pen 201, based on the electric potential. The stylus pen 201 may be implemented according to an Active ElectroStatic (AES) scheme, and there may be no limitation in a type of the implementation. In addition, the electronic device 101 may detect the stylus pen 201, based on a change in capacitance (self-capacitance or mutual capacitance) associated with at least one electrode of a touch panel. In this case, the resonant circuit 287 may not be included in the stylus pen 201.

The resonant circuit 287 may include a coil, an inductor, and/or a capacitor. The resonant circuit 287 may resonate based on an input electric field and/or magnetic field (e.g., an electric field and/or magnetic field generated from the digitizer of the electronic device 101). When the stylus pen 201 transmits a signal according to the EMR scheme, the stylus pen 201 may generate a signal including a resonant frequency, based on an electromagnetic field generated from an inductive panel of the electronic device 101. When the stylus pen 201 transmits a signal according to the AES scheme, the stylus pen 201 may generate a signal by using capacity coupling with the electronic device 101. When the stylus pen 201 transmits a signal according to the ECR scheme, the stylus pen 201 may generate a signal including a resonant frequency, based on an electromagnetic field generated from a capacitive device of the electronic device. The resonant circuit 287 may be used to change a frequency or strength of an electromagnetic field according to a user's manipulation state. For example, the resonant circuit 287 may provide various frequencies for recognizing a hovering input, a drawing input, a button input, or an erasing input. For example, the resonant circuit 287 may provide various resonant frequencies according to a connection combination of a plurality of capacitors, or may provide various resonant frequencies, based on a variable inductor and/or a variable capacitor.

When the charging circuit 288 is coupled to the resonant circuit 287, based on a switching circuit, a resonant signal generated from the resonant circuit 287 may be rectified into a Direct Current (DC) signal and provided to the battery 289. The stylus pen 201 may use a voltage level of the DC signal detected from the charging circuit 288 to determine whether the stylus pen 201 is inserted to the electronic device 101. Alternatively, the stylus pen 201 may identify a pattern corresponding to a signal identified in the charging circuit 288 to identify whether the stylus pen 201 is inserted to the electronic device 101.

The battery 289 may be configured to store power required for the operation of the stylus pen 201. The battery 289 may include, for example, a lithium-ion battery or a capacitor, and may be rechargeable or exchangeable. According to an embodiment, the battery 289 may be charged by using power (e.g., a DC signal (DC power)) provided from the charging circuit 288.

The communication circuit 290 may be configured to perform a wireless communication function between the stylus pen 201 and a communication module (e.g., the communication module 190 of FIG. 1) of the electronic device (e.g., the electronic device 101 of FIG. 1). The communication circuit 290 may transmit state information, input information, and/or location-related information of the stylus pen 201 to the electronic device 101 by using a short-range communication scheme. For example, the communication circuit 290 may transmit, to the electronic device 101, direction information (e.g., motion sensor data) of the stylus pen 201 acquired through the trigger circuit 298, voice information input through a microphone (not shown), or information on remaining power of the battery 289. For example, the communication circuit 290 may transmit, to the electronic device 101, sensing data acquired from the sensor 299 and/or information related to a location of the stylus pen 201, identified based on the sensing data. For example, the communication circuit 290 may transmit, to the electronic device 101, information on a state of a button (e.g., the button 337 of FIG. 3) disposed to the stylus pen 201. As an example, the short-range communication scheme may include at least one of Bluetooth, Bluetooth Low Energy (BLE), Near Field Communication (NFC), and/or Wi-Fi direct, but a type thereof is not limited thereto.

The antenna 297 may be used to transmit a signal or power to the outside (e.g., the electronic device 101) or to receive the signal or power from the outside. The stylus pen 201 may include the plurality of antennas 297, and may select at least one of the antennas 297 suitable for a communication scheme. Through the selected at least one antenna 297, the communication circuit 290 may exchange the signal or power with an external electronic device.

The trigger circuit 298 may include at least one button (e.g., the button 227 of FIG. 4) or the sensor 299. The processor 220 may identify an input mechanism (e.g., touching or pressing) or type (e.g., an EMR button or a BLE button) of the button of the stylus pen 201. The trigger circuit 298 may transmit a trigger signal to the electronic device 101 by using an input signal of the button or a signal through the sensor 299.

The sensor 299 may include an accelerometer, a gyro sensor, and/or a geomagnetic sensor. The accelerometer may sense information on linear movement of the stylus pen 201 and/or acceleration for three axes of the stylus pen 201. The gyro sensor may sense information related to rotation of the stylus pen 201. The geomagnetic sensor may sense information on a direction in an absolute coordinate system of the stylus pen 201. The sensor 299 may include not only a sensor for measuring movement, but also a sensor capable of generating an electric signal or data value corresponding to an internal operating state or external environment state of the stylus pen 201, such as at least one of a sensor for detecting remaining power of the battery 289, a pressure sensor, an optical sensor, a temperature sensor, and a biometric sensor. The processor 220 may transmit information acquired from the sensor 299 to the electronic device 101 through the communication circuit 290. Alternatively, based on the information acquired from the sensor 299, the processor 220 may transmit information related to a location of the stylus pen 201 (e.g., a coordinate of the stylus pen 201 and/or a displacement of the stylus pen 201) to the electronic device 101 through the communication circuit 290.

Figure 4:
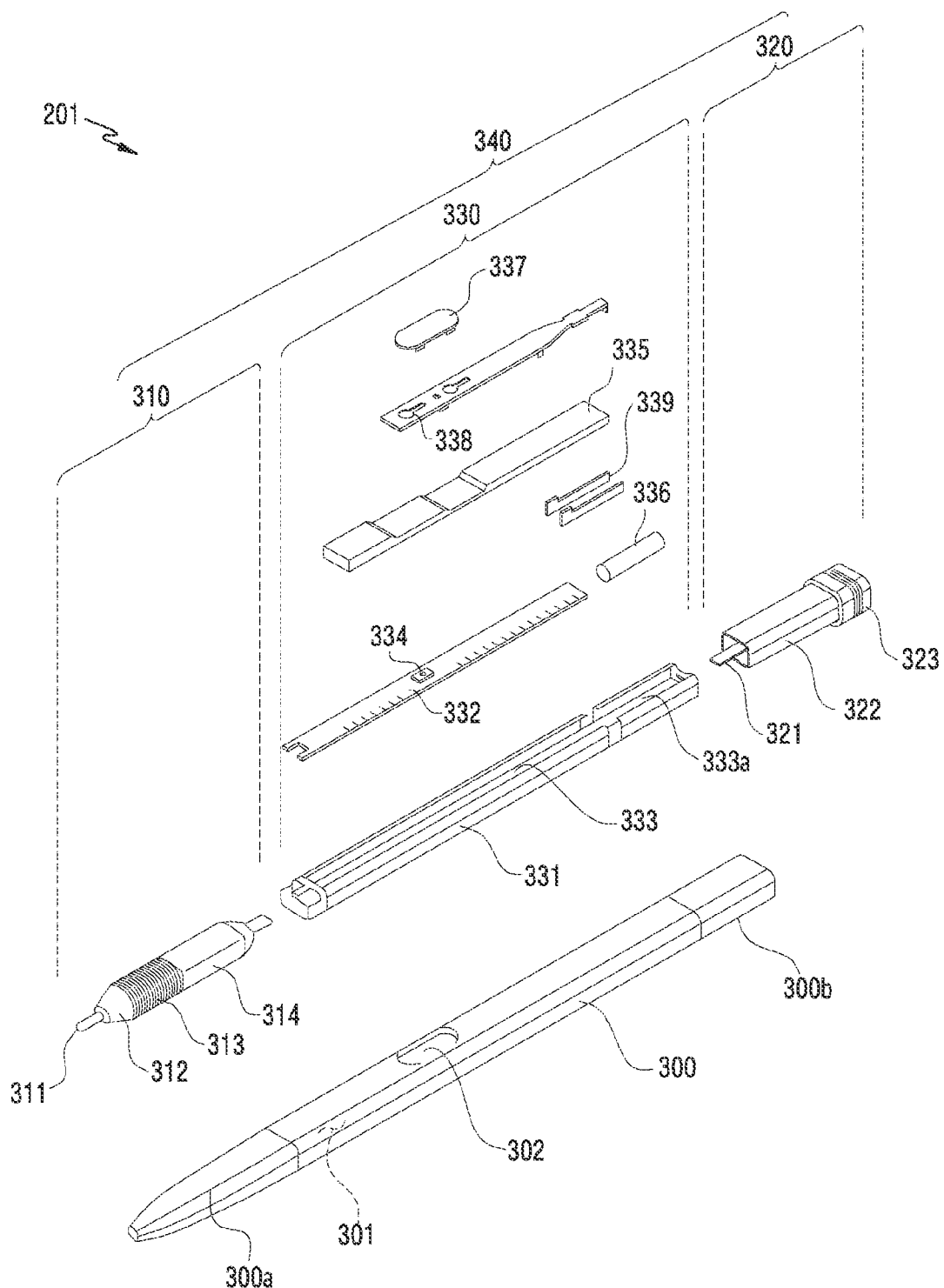
FIG. 4 is an exploded perspective view of a stylus pen according to an embodiment of the disclosure.

FIG. 4 is an exploded perspective view of a stylus pen 201 (e.g., the stylus pen 201 of FIG. 2) according to an embodiment of the disclosure.

Referring to FIG. 4, the stylus pen 201 may include a pen housing 300 constituting an exterior of the stylus pen 201 and an inner assembly 340 inside the pen housing 300. As shown in FIG. 4, the inner assembly 340 may be inserted into the pen housing 300 by performing an assembly operation one time, in a state where several components mounted inside the stylus pen 201 are combined together.

The pen housing 300 may have a shape elongated between a first end 300a and a second end 300b, and may include a second inner space 301 inside thereof. A cross-section of the pen housing 300 may have a shape of an ellipse consisting of a long axis and a short axis, and may be constructed in a cylindroid shape as a whole. The first inner space 212 of the electronic device 101 described above with reference to FIG. 2 may also be constructed to have an elliptical cross-section corresponding to a shape of the pen housing 300. The pen housing 300 may be formed of, at least in part, a synthetic resin (e.g., plastic) and/or a metallic material (e.g., aluminum). For example, the first end 300a of the pen housing 300 may be constructed of a synthetic resin material. Other embodiments may be applied to the material of the pen housing 300.

The inner assembly 340 may have an elongated shape corresponding to the shape of the pen housing 300. The inner assembly 340 may be roughly divided into three types of configurations along a lengthwise direction. For example, the inner assembly 340 may include a coil portion 310 disposed at a location corresponding to the first end 300a of the pen housing 300, an ejection member 320 disposed at a location corresponding to the second end 300b of the pen housing 300, and a circuit board portion 330 disposed at a location corresponding to a body of the pen housing 300.

The coil portion 310 may include a pen tip 311, which is exposed to the outside of the first end 300a when the inner assembly 340 is completely inserted to the pen housing 300, a packing ring 312, a coil 313, which is wound several times, and/or a pen pressure sensor 314 for acquiring a pressure change depending on pressure of the pen tip 311. The packing ring 312 may be formed of epoxy, rubber, urethane, or silicone. The packing ring 312 may be arranged so as to make the stylus pen 201 waterproof and dustproof; for example, the packing ring 312 may be disposed protect the coil portion 310 and the circuit board portion 330 against water permeation or dust. The coil 313 may produce a resonant frequency in a set frequency band (e.g., 500 KHz), and may be combined with at least one element (e.g., a capacitive capacitor) to adjust the resonant frequency produced by the coil 313 in a range of a specific level.

The ejection member 320 may be configured to remove the stylus pen 201 from a first inner space (e.g., the first inner space 212) of an electronic device (e.g., the electronic device 101 of FIG. 2). The ejection member 320 may include a shaft 321, an ejection body 322 disposed around the shaft 321 and constituting an overall exterior of the ejection member 320, and a button portion 323 (e.g., the first button 201a of FIG. 2). When the inner assembly 340 is completely inserted into the pen housing 300, a portion including the first shaft 321 and ejection body 322 may be surrounded by the second end 300b of the pen housing 300, and at least part of the button portion 323 may be exposed to the outside of the second end 300b. A plurality of components (not shown), such as cam members or elastic members, may be disposed in the ejection body 322 to constitute a push-pull structure. The button portion 323 may be substantially coupled with the shaft 321 to perform a linear reciprocating motion with respect to the ejection body 322. The button unit 323 may include a button having a hook structure so that a user can remove the stylus pen 201 by using a fingernail. The stylus pen 201 may provide another input mechanism by including a sensor for detecting the linear reciprocating motion of the shaft 321.

The circuit board portion 330 may include a PCB 332, a base 331 surrounding at least one face of the PCB 332, a switch 334, an element 335, a second button 337, a support member 338, and an antenna 339 (e.g., the antenna 297 of FIG. 3). A substrate mounting portion 333 to which the PCB 332 is disposed may be constructed on an upper face of the base 331, and the PCB 332 may be fixed in a state of being mounted to the substrate mounting portion 333. The PCB 332 may include a first face and a second face. The switch 334 or a variable capacitance capacitor (not shown) coupled to the coil 313 may be disposed on the first face. A charging circuit (not shown) (e.g., the charging circuit 288 of FIG. 3), a battery 336 (e.g., the battery 389 of FIG. 3), or a communication circuit (not shown) (e.g., the communication circuit 290 of FIG. 3) may be disposed on the second face. The first face and second face of the PCB 332 may refer to laminated faces different from each other in a vertically laminated structure, and may refer to portions different from each other in a PCB disposed along a lengthwise direction of the PCB 332. The battery 336 may include an Electronic Double Layered Capacity (EDLC) or a lithium ion battery. A charging circuit (not shown) (e.g., the charging circuit 288 of FIG. 3) may be located between the coil 313 and the battery 336, and may include a voltage detector circuity and a rectifier. The battery 336 does not need to be disposed on the second face of the PCB 332. For example, the battery 336 may be located in various positions according to various mounting structures of the PCB 332, and may be disposed at a location different from that shown in the figure.

The antenna 339 may include the antenna structure 339 as shown in the example of FIG. 4 and/or an antenna embedded in the PCB 332. The switch 334 may be disposed on the PCB 332. The second button 337 may be used to press the switch 334, and may be exposed to the outside through a lateral opening portion 302 of the pen housing 300. The second button 337 may be supported by the support member 338, and when there is no external force acting on the second button 337, the support member 338 may provide elastic restoration force so that the second button 337 is restored or maintained in a state of being disposed at a specific location. The second button 337 may be implemented as any one of physical key, touch key, motion key, pressure key, and keyless manners, and there is no limitation in an implementation form of the button.

The circuit board portion 330 may include a packing ring such as an O-ring. For example, an O-ring made of an elastic body may be disposed at both ends of the base 331, so that a sealing structure is constructed between the base 331 and the pen housing 300. The support member 338 may be closely in contact with an inner wall of the pen housing 300 around the lateral opening portion 302 to construct the sealing structure. For example, the circuit board portion 330 may include a waterproof and dustproof structure similar to the packing ring 312 of the coil portion 310 in at least one portion thereof.

The stylus pen 201 may include a battery mounting portion 333a in which the battery 336 is disposed on an upper face of the base 331. The battery 336 mountable to the battery mounting portion 333a may include a cylinder-type battery.

The stylus pen 201 may include a microphone (not shown) and/or a speaker (not shown). The microphone and/or the speaker may be coupled directly to the PCB 332 or coupled to an additional Flexible Printed Circuit Board (FPCB) (not shown) coupled to the PCB 332. The microphone and/or the speaker may be disposed in the same direction on the same line as the second button 337 of the stylus pen 201.

Figure 5:
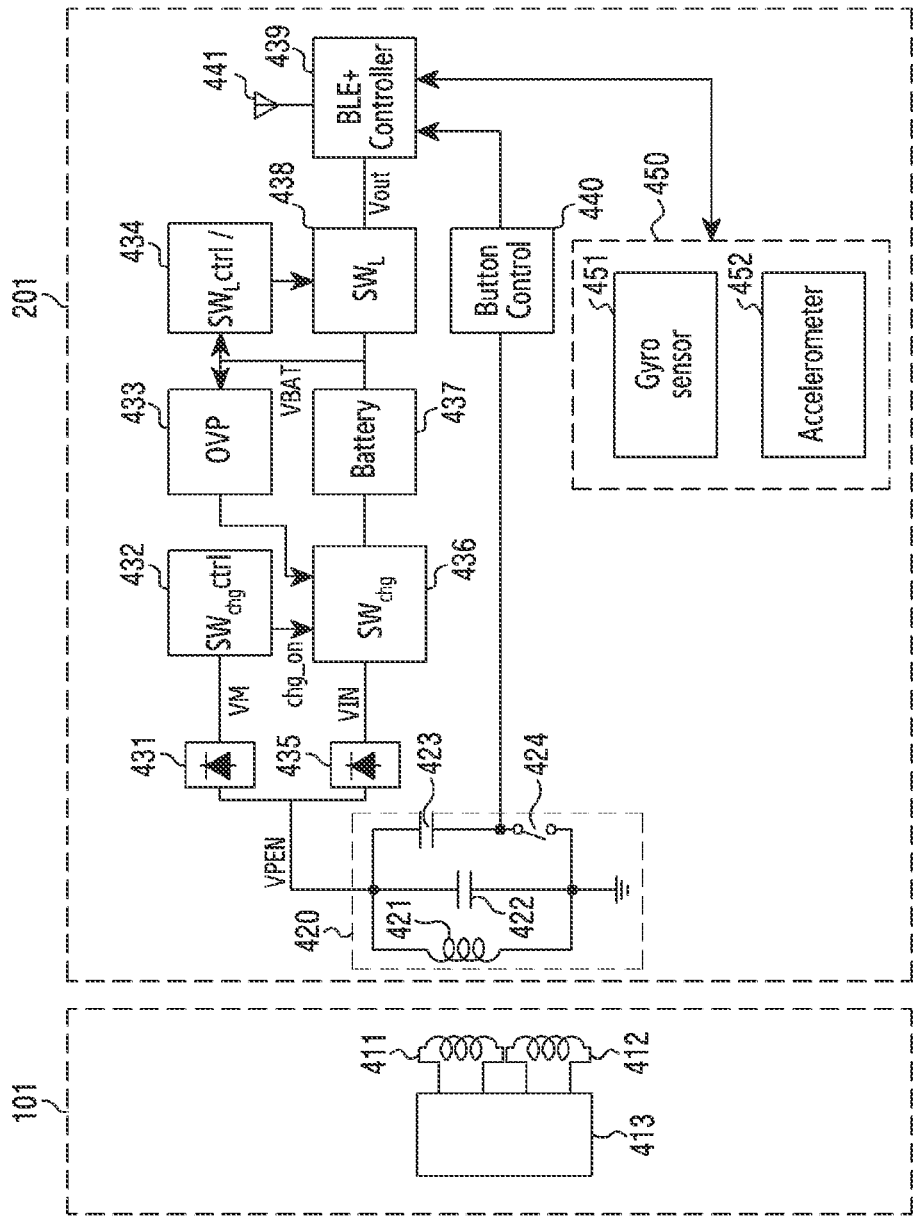
FIG. 5 illustrates a structure of an electronic device and a stylus pen according to an embodiment of the disclosure.

FIG. 5 illustrates a structure of an electronic device and a stylus pen according to an embodiment of the disclosure.

Referring to FIG. 5, the electronic device (e.g., the electronic device 101 of FIG. 1 or the electronic device 101 of FIG. 2) may include a pen controller 413 and one or more coils 411 and 412.

The pen controller 413 may include the one or more coils 411 and 412. The pen controller 413 may provide charging power to the stylus pen 201 (e.g., the stylus pen 201 of FIG. 1) through the one or more coils 411 and 412. When the stylus pen 201 is inserted to an accommodating space (e.g., the first inner space 212 of FIG. 2) of the electronic device 101, the one or more coils 411 and 412 may be disposed at a location physically adjacent to the coil 421 of the stylus pen 201, but the disposition location is not limited thereto. The electronic device 101 may include a mounting region (or space) in which the stylus pen 201 is mountable (or attachable), in addition to the accommodating space. In this case, the stylus pen 201 may be detachable from the region (or space). An operation of the stylus pen 201 when the stylus pen 201 is located in the accommodating space may be performed when the stylus pen 201 is attached to the mounting region (or space). At least some functions of the pen controller 413 may be performed by a processor (e.g., the processor 220 of FIG. 3), or the pen controller 413 and the processor 220 may be implemented in an integral manner to perform the functions. When the pen controller 413 is described as performing a specific operation, this may indicate that the operation is performed by a processor (e.g., the processor 220 of FIG. 3), or is performed by a control circuit independent of the processor (e.g., the processor 220 of FIG. 3). In addition to the one or more coils 411 and 412, the pen controller 413 may include a control circuit (e.g., a control circuit independent of the processor), an inverter, and/or an amplifier. As described above, the control circuit may be omitted. In this case, a signal for charging may be provided to the one or more coils 411 and 412 under the control of the processor (e.g., the processor 220 of FIG. 3).

The pen controller 413 may provide a signal having a designated pattern, through the one or more coils 411 and 412. The designated pattern is pre-shared with the stylus pen 201 for the control of the stylus pen 201, and may include a charging initiation indication pattern, a charging end indication pattern, or a detection pattern, and there is no limited in a type thereof. Although FIG. 5 shows that the two coils 411 and 412 provide a signal for charging or a signal having a pattern for a control, the number of coils is not limited thereto.

As shown in FIG. 5, the stylus pen 201 may include a resonant circuit 420, one or more rectifiers 431 and 435, a charging switch controller (SWchg ctrl) 432, an Over-Voltage Protection circuit (OVP) 433, a load switch controller (SWL ctrl) 434, a charging switch (SWchg) 436, a battery 437 (e.g., the battery 289 of FIG. 3), a load switch (SWL) 438, a BLE communication circuit and controller (BLE+controller) 439, a button control circuit 440, and a sensor circuit 450 (e.g., the sensor 299 of FIG. 3).

The resonant circuit 420 (e.g., the resonant circuit 287 of FIG. 3) of the stylus pen 201 may include a coil 421, one or more capacitors 422 and 423, and/or a switch 424. When the switch 424 is in an off-state, the coil 421 and the capacitor 422 may constitute a resonant circuit, and when the switch 424 is in an on-state, the coil 421 and the capacitors 422 and 423 may constitute the resonant circuit. As a result, a resonant frequency of the resonant circuit 420 may be changed according to the on/off state. For example, the electronic device 101 may identify the on/off state of the switch 424, based on a frequency of a signal from the stylus pen 201. When a button 337 of the stylus pen 201 is pressed/released, the switch 424 may be on/off, and the electronic device 101 may identify whether the button 337 of the stylus pen 201 is pressed, based on a frequency of a received signal identified through a digitizer.

The one or more rectifiers 431 and 435 may rectify and output an Alternating Current (AC) waveform signal VPEN output from the resonant circuit 420. The SWchg ctrl 432 may receive a rectified signal VM output from the rectifier 431. Based on the rectified signal VM, the SWchg ctrl 432 may identify whether a signal generated from the resonant circuit 420 is a signal for charging or a signal for location detection. For example, the SWchg ctrl 432 may identify whether the signal generated from the resonant circuit 420 is a signal for charging or a signal for location detection, for example, based on a magnitude of voltage of the rectified signal VM. Alternatively, the SWchg ctrl 432 may identify whether a signal having a charging initiation pattern is input based on a waveform of the rectified signal VM.

When the signal is for charging, the SWchg ctrl 432 may control the charging switch (SWchg) 436 to be in the on-state. Alternatively, upon detecting a signal having a pattern for charging initiation, the SWchg ctrl 432 may control the SWchg 436 to be in the on-state. The SWchg ctrl 432 may transfer the charging initiation signal chg_on to the SWchg 436. In this case, a rectified signal VIN may be transferred to the battery 437 (e.g., the battery 289 of FIG. 3) through the SWchg 436. The battery 437 may be charged by using the received rectified signal VIN. The OVP 433 may identify a battery voltage VBAT, and if the battery voltage exceeds an over-voltage threshold, may control the SWchg 436 to be in the off-state.

When the battery voltage exceeds an operating voltage threshold, the SWchg ctrl 434 may control the SWL 438 to be in the on-state. When the load switch 438 is in the on-state, power from the battery 437 may be transferred to the BLE+controller 439 (e.g., the communication circuit 290 and processor 220 of FIG. 3A). The BLE+controller 439 may operate by using the received power. If a distance between the stylus pen 201 and the electronic device 101 is greater than a threshold distance (e.g., a distance capable of recognizing a hovering input), the button control circuit 440 may transfer information on an input of a button (e.g., the button 337) to the BLE+controller 439. The BLE+controller 439 may transmit information on the received button input to the electronic device 101 through an antenna 441 (e.g., the antenna 297 of FIG. 3). The sensor circuit 450 (e.g., the sensor 299 of FIG. 3) may include a gyro sensor 451 and/or an accelerometer 452. Sensing data acquired by the gyro sensor 451 and/or the accelerometer 452 may be transferred to the BLE+controller 439. The BLE+controller 439 may transmit a communication signal including the received sensing data to the electronic device 101 through the antenna 441. Alternatively, the BLE+controller 439 may identify information related to a location of the stylus pen 201 (e.g., a coordinate and/or displacement of the stylus pen 201), identified based on the received sensing data. The BLE+controller 439 may transmit the identified information related to the location of the stylus pen 201 to the electronic device 101 through the antenna 441. When the stylus pen 201 is removed from the electronic device 101, the BLE+controller 439 may activate the accelerometer 452. When the button (e.g., the button 337) is pressed, the BLE+controller 439 may activate the gyro sensor 451. There is no limitation in the activation timing for each sensor. In addition, the sensor circuit 450 may further include a geomagnetic sensor (not shown). When only the accelerometer 452 is activated, the stylus pen 201 may provide acceleration information measured by the accelerometer 452 to the electronic device 101, and the electronic device 101 may operate based on both location and acceleration information of the stylus pen 201, identified based on a pen signal.

Figure 6:
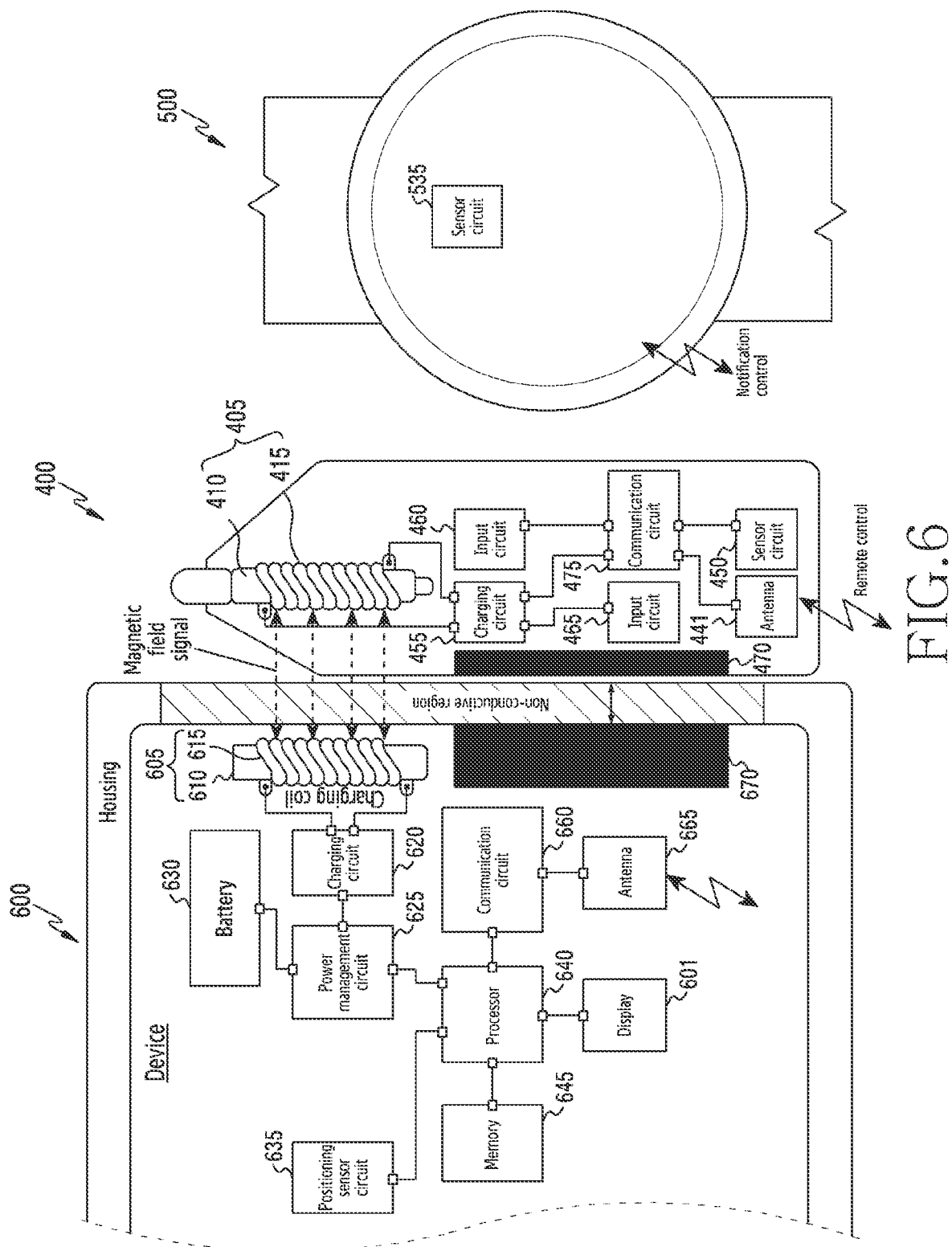
FIG. 6 illustrates a structure of a network (e.g., Bluetooth Low Energy (BLE) communication network) device and a stylus attached to the outside of an electronic device according to an embodiment of the disclosure.

FIG. 6 illustrates a structure of a network (e.g., BLE communication network) device and a remote input device (e.g., the stylus pen 201 of FIG. 2) attached to the outside of an electronic device (e.g., the electronic device 101 of FIG. 2) according to an embodiment of the disclosure.

Figure 7:
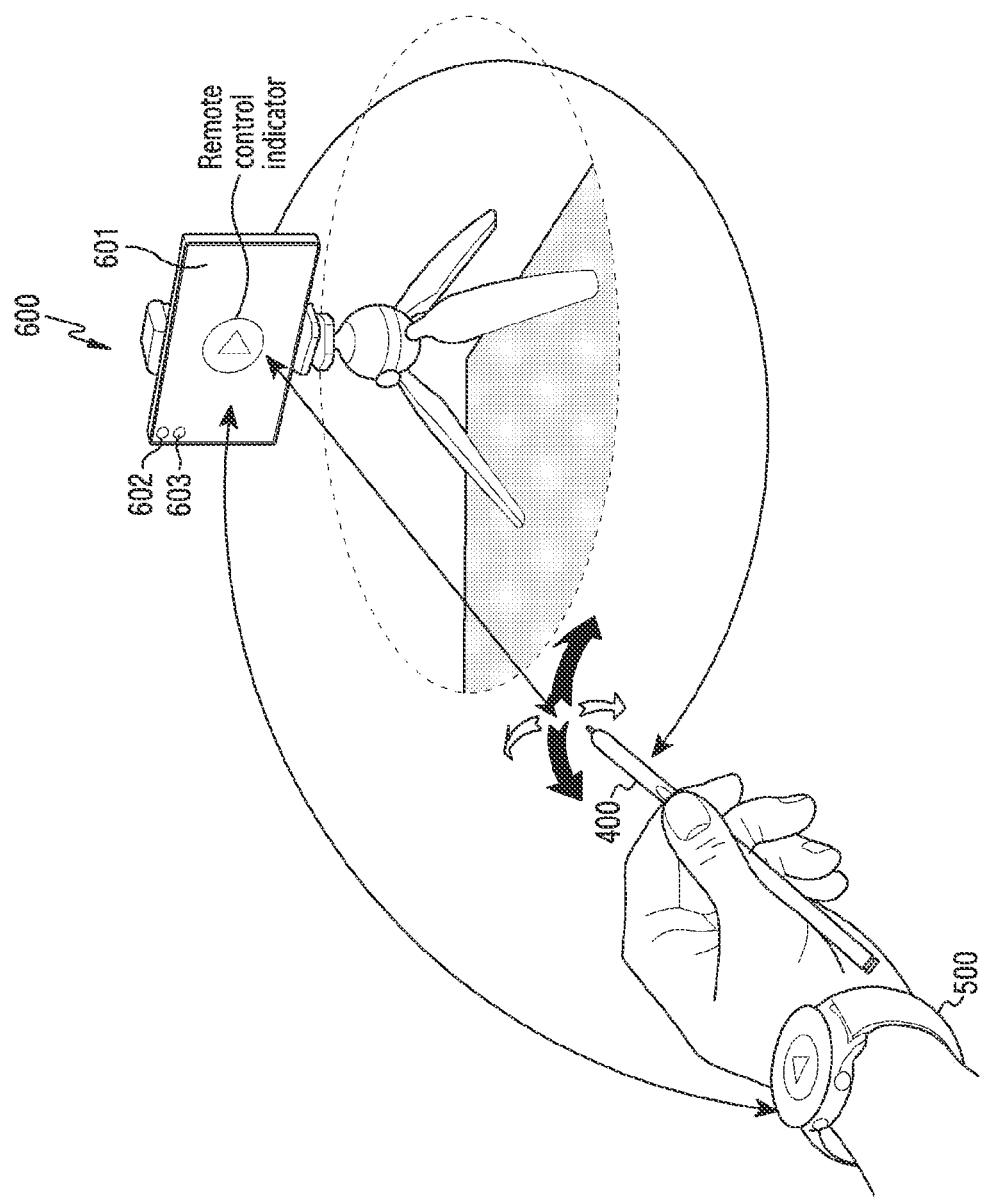
FIG. 7 illustrates that a remote control input is performed on an electronic device by using a remote input device (e.g., a stylus), and a notification for the remote input device (e.g., the stylus) is provided through a wearable device according to an embodiment of the disclosure.

FIG. 7 illustrates that a remote control input is performed on the electronic device by using the remote input device, and a notification for the remote input device is provided through a wearable device according to an embodiment of the disclosure.

Referring to FIGS. 6 and 7, a network (e.g., a BLE communication network) may include the electronic device 600, the remote input device 400 (e.g., the stylus pen 400), and the wearable device 500. As a master device, the electronic device 600 may be coupled to the stylus pen 400 and the wearable device 500.

The electronic device 600 may include a first wireless charging coil 605, a charging circuit 620, a power management circuit 625 (e.g., the power management module 188 of FIG. 1), a battery 630 (e.g., the battery 189 of FIG. 1), a positioning sensor circuit 635 (e.g., the sensor module 176 of FIG. 1), a processor 640 (e.g., the processor 120 of FIG. 1), a memory 645 (e.g., the memory 130 of FIG. 1), a display 601 (e.g., the display device 160 of FIG. 1), a communication circuit 660 (e.g., the communication module 190 of FIG. 1), an antenna 665 (e.g., the antenna module 197 of FIG. 1), and a magnet 670. The electronic device 600 may include one or more cameras 602 and 603. The electronic device 600 may display an image on a front face through the display 601 (e.g., the display device 160 of FIG. 1), and may recognize a remote control input of the stylus pen 400 through the one or more cameras 602 and 603.

The power management circuit 625 (e.g., the power management module 188 of FIG. 1) may be coupled with the charging circuit 620, the battery 630, and the processor 640. The power management circuit 625 may manage power supplied to the electronic device 600. The power management circuit 625 may be implemented as at least part of a Power Management Integrated Circuit (PMIC).

The battery 630 (e.g., the battery 189 of FIG. 1) may supply power to at least one component of the electronic device 600. The battery 630 may include a primary cell which is not rechargeable, a secondary cell which is rechargeable, or a fuel cell.

The communication circuit 660 (e.g., the communication module 190 of FIG. 1) may support establishing a direct (e.g., wired) communication channel or a wireless communication channel between the electronic device 600 and the external electronic device (e.g., the stylus pen 400 or the wearable device 500), another electronic device, and a server (e.g., the server 108 of FIG. 1) and communicating via the established communication channel. The communication circuit 660 (e.g., the communication module 190 of FIG. 1) may operate independently of the processor 640 (e.g., the processor 120 of FIG. 1). The communication circuit 660 (e.g., the communication module 190 of FIG. 1) may include one or more communication processors which support direct (e.g., wired) communication or wireless communication.

The memory 645 (e.g., the memory 130 of FIG. 1) may store a variety of data used by at least one component (e.g., the processor 640 or the positioning sensor circuit 635, for example, the sensor module 176 of FIG. 1) of the electronic device 600. The data may include software (e.g., the program 140 of FIG. 1) and input data or output data for commands related thereto. The memory 645 (e.g., the memory 130 of FIG. 1) may include a volatile memory (e.g., the volatile memory 132 or non-volatile memory 134 of FIG. 1).

The positioning sensor circuit 635 (e.g., the sensor module 176 of FIG. 1) may detect an operational state (e.g., power or temperature) of the electronic device 600 or an external environment state (e.g., a user state), and may generate an electrical signal or data value corresponding to the detected state. The positioning sensor circuit 635 (e.g., the sensor module 176 of FIG. 1) may include a gesture sensor, a gyro sensor, an atmospheric pressure sensor, a magnetic sensor, an accelerometer, a grip sensor, a proximity sensor, a color sensor, an Infrared (IR) sensor, a biometric sensor, a temperature sensor, a humidity sensor, or an illuminance sensor.

The antenna 665 (e.g., the antenna module 197 of FIG. 1) may transmit a signal or power to an external device (e.g., the external electronic device) or may receive the signal or power from the external device. The antenna 665 (e.g., the antenna module 197 of FIG. 1) may include one antenna including a radiator consisting of a conductor or conductive pattern formed on a substrate (e.g., a PCB). The antenna 665 (e.g., the antenna module 197 of FIG. 1) may include a plurality of antennas. In this case, at least one antenna may be selected, which is suitable for a communication scheme used in the stylus pen 400, the wearable device 500, or the communication network (e.g., the first network 198 and/or second network 199 of FIG. 1).

The display 601 (e.g., the display device 160 of FIG. 1) may visually provide information to the outside (e.g., a user) of the electronic device 600. The display 601 (e.g., the display device 160 of FIG. 1) may include a hologram device, or a projector and control circuitry to control a corresponding device. The display 601 (e.g., the display device 160 of FIG. 1) may include a touch circuitry adapted to detect a touch or a sensor circuitry (e.g., a pressure sensor) adapted to measure the intensity of force incurred by the touch. A digitizer capable of receiving an input of the stylus pen 400 may be included in the display 601.

The stylus pen 400 may include a second charging coil 405, an antenna 441 (e.g., the antenna 297 of FIG. 3 or the antenna 441 of FIG. 5), a sensor circuit 450 (e.g., the sensor 299 of FIG. 3 or the sensor circuit 450 of FIG. 4), a charging circuit 455 (e.g., the charging circuit 288 of FIG. 3), an input circuit 460, a battery 465 (e.g., the battery 289 of FIG. 3), a magnet 470, and a communication circuit 475 (e.g., the communication circuit 290 of FIG. 3).

The stylus pen 400 may be attached to the outside of the electronic device 600 by using the magnet 670 included in the electronic device 600 and the magnet 470 included in the stylus pen 400. A housing of the electronic device 600 may include a non-conductive region, and the stylus pen 400 may be attached to the electronic device 600 with the non-conductive region disposed therebetween. The stylus pen 400 may be attached to or detached from the electronic device 600, and the electronic device 600 may recognize an attached and detached state of the stylus pen 400. As another example, the stylus pen 400 may be inserted into or removed from the inside of the electronic device 101. When the stylus pen 400 is accommodated or removed in the inside of the electronic device 101, an accommodated or removed state of the stylus pen 400 may be detected by using the first wireless charging coil 605.

A coil 615 may be wound around a ferrite core 610 to constitute the first wireless charging coil 605 of the electronic device. A coil 415 (e.g., the coil 421 of FIG. 5) may be wound around a ferrite core 410 to constitute the second wireless charging coil 405 of the stylus pen 400. The first wireless charging coil 605 and the second wireless charging coil 405 may transmit/receive electromagnetic signals. The electronic device 600 may detect the attached/detached state of the stylus pen 400 by using the first wireless charging coil 605.

A magnetic field signal may be generated between the first wireless charging coil 605 of the electronic device 600 and the second wireless charging coil 405 of the stylus pen 400. Based on a change in the magnetic field signal between the first wireless charging coil 605 and the second wireless charging coil 405, the electronic device 600 may detect the attached/detached state of the stylus pen 400. When the stylus pen 400 is detached from the electronic device 600, a matching state between the first wireless charging coil 605 of the electronic device 600 and the second wireless charging coil 405 of the stylus pen 400 may be changed. The electronic device 600 may receive an electric signal greater than or equal to a threshold voltage through generation of an induced magnetic field based on the change in the matching state. The first wireless charging coil 605 of the electronic device 600 and the second wireless charging coil 405 of the stylus pen 400 may transmit or receive the magnetic field signal. When the second wireless charging coil 405 of the stylus pen 400 approaches the first wireless charging coil 605 of the electronic device 600, a resonance signal (an induced magnetic field signal) may be generated between the electronic device 600 and the stylus pen 400.

The electronic device 600 may identify whether the stylus pen 400 is attached or detached based on the resonance signal. When the stylus pen 400 is detached (or separated), since a distance between the electronic device 600 and the stylus pen 400 increases, the resonance signal is not generated. As a result, the electronic device 600 can detect an attachment/detachment of the stylus pen 400. When an electric signal greater than or equal to a threshold voltage is generated through the first wireless charging coil 605, the electronic device 600 may recognize a state where the electronic device 600 is attached (or accommodated).

In the attached or accommodated state, the electronic device 600 and the stylus pen 400 may persistently transmit/receive a communication signal including charging power and data through the matched first and second wireless charging coils 605 and 405. When the electric signal greater than or equal to the threshold voltage is not received through the first wireless charging coil 605, the electronic device 600 may recognize that the stylus pen 400 is detached (or separated).

The electronic device 600 may detect an attach operation for the stylus pen 400 (e.g., the remote input device). The electronic device 600 may execute a charging operation of the stylus pen 400 by using the first wireless charging coil 605.

The first wireless charging coil 605 of the electronic device 600 and the second wireless charging coil 405 of the stylus pen 400 may be attached to a matching position by means of the first magnet 670 and the second magnet 470. For example, the first magnet 670 and the second magnet 470 may include magnets having a plurality of polarities (e.g., N-pole and S-pole), so that the stylus pen 400 is induced to be attached to a designated position of the electronic device 600.

When the first wireless charging coil 605 of the electronic device 600 and the second wireless charging coil 405 of the stylus pen 400 are in a matching state, the electronic device 600 may receive an electric signal greater than or equal to a threshold voltage caused by an induced magnetic field through the first wireless charging coil 605. The electronic device 600 may detect an attach or detach operation of the stylus pen 400 in response to the electronic signal greater than or equal to the threshold voltage.

The electronic device 600 may share power of the batteries 630 and 465 with the stylus pen 400 through the induced magnetic field generated in the first wireless charging coil 605 at the matching position. The electronic device 600 may store/load remote control activation information, an execution command corresponding to a remote control input (e.g., a button input or a gesture input), and remote control notification activation information for the wearable device 500 through the memory 645.

As shown in FIG. 7, the electronic device 600 may detect the detach operation for the stylus pen 400 (e.g., the remote input device). For example, the electronic device 600 may detect the detach operation of the stylus pen 400, based on an induced magnetic field signal detected in a charging coil (e.g., the charging coil 605 of FIG. 6). When the electronic device 600 detects the detach operation of the stylus pen 400, a motion of the stylus pen 400 may be recognized. For example, the motion of the stylus pen 400 may be determined by receiving a variation measured in a sensor circuit (e.g., the sensor circuit 450 of FIG. 6) of the stylus. Upon detecting the detach operation for the stylus pen 400, the electronic device 600 may measure a distance to the stylus pen 400.

The electronic device 600 may provide a user with a notification indicating the distance to the stylus pen 400 through the wearable device 500. For example, based on a distance value measured with respect to the stylus pen 400, the electronic device 600 may provide the user with a notification indicating that the distance to the stylus pen 400 exceeds a short range through the wearable device 500. As another example, based on the distance value measured with respect to the stylus pen 400, the electronic device 600 may provide the user with a notification indicating that the distance to the stylus pen 400 is a long range (e.g., about 1 m to 10 m) through the wearable device 500. As another example, based on the distance value measured with respect to the stylus pen 400, the electronic device 600 may provide the user with a notification indicating that the distance to the stylus pen 400 is out of a maximum communication distance (e.g., exceeding about 10 m) through the wearable device 500.

The short range may refer to a distance (within about 1 m) that can be measured with an infrared or ultrasonic sensor. The long range may indicate a distance within about 10 m supported in Bluetooth. When in the short range, the user is in close proximity to the electronic device 600, and thus a notification may be displayed to the wearable device 500. The electronic device 600 may display the notification from a moment at which the stylus pen 400 is out of the short range. When the user holds the stylus pen 400 within a range of about 1 m to 10 m from the electronic device 600, for user convenience, the electronic device 600 may control the wearable device 500 to display the notification related to the stylus pen 400.

A communication circuit (e.g., the communication circuit 475 of FIG. 6) of the stylus pen 400 and a communication circuit (e.g., the communication circuit 560 of FIG. 6) of the wearable device 500 may support the same short-range communication network (e.g., Bluetooth, Wi-Fi, or another short-range communication network) or may support different short-range communication networks. The communication circuit 560 of the wearable device 500 may maintain a communication connection with the communication circuit 660 of the electronic device 600 at a longer distance than the communication circuit 475 of the stylus pen 400.

The electronic device 600 may recognize a motion of the stylus pen 400 by using the first depth camera Rx 602 (e.g., a transmitter) and the second depth camera Tx 603 (e.g., a receiver), and may recognize a remote control input, based on the motion of the stylus pen 400. As an example, the electronic device 600 may include a depth camera, and may use the depth camera to measure a distance at which the user or the stylus pen 400 is located. As another example, the electronic device 600 may recognize a motion of the stylus pen 400 through an infrared optical device (not shown), and may recognize a remote control input, based on the motion of the stylus pen 400. The electronic device 600 may output an infrared signal through a transmitter of the infrared optical device and receive a reflected infrared signal through a receiver, thereby detecting/determining a gesture motion and distance information with respect to the stylus pen 400.

A sensor circuit 535 of the wearable device 500 may include at least one of a wearing detection sensor (e.g., a capacitive sensor/optical proximity sensor) which detects user's wearing, a touch sensor (e.g., a wristwatch-type display touch panel, a wireless earphone touch panel) which detects a touch input, a motion sensor (e.g., an acceleration/gyro/geomagnetic sensor) which detects a user's motion, and a biometric sensor (e.g., a Heart Rate Monitor (HRM) sensor, an Electrocardiography (ECG) sensor) which measures user's health information.

The electronic device 600 may receive wearing detection sensor data from the wearable device 500 coupled for communication. The electronic device 600 may identify the wearable device 500 capable of controlling a notification, based on the received wearing detection sensor data.

Figure 8:
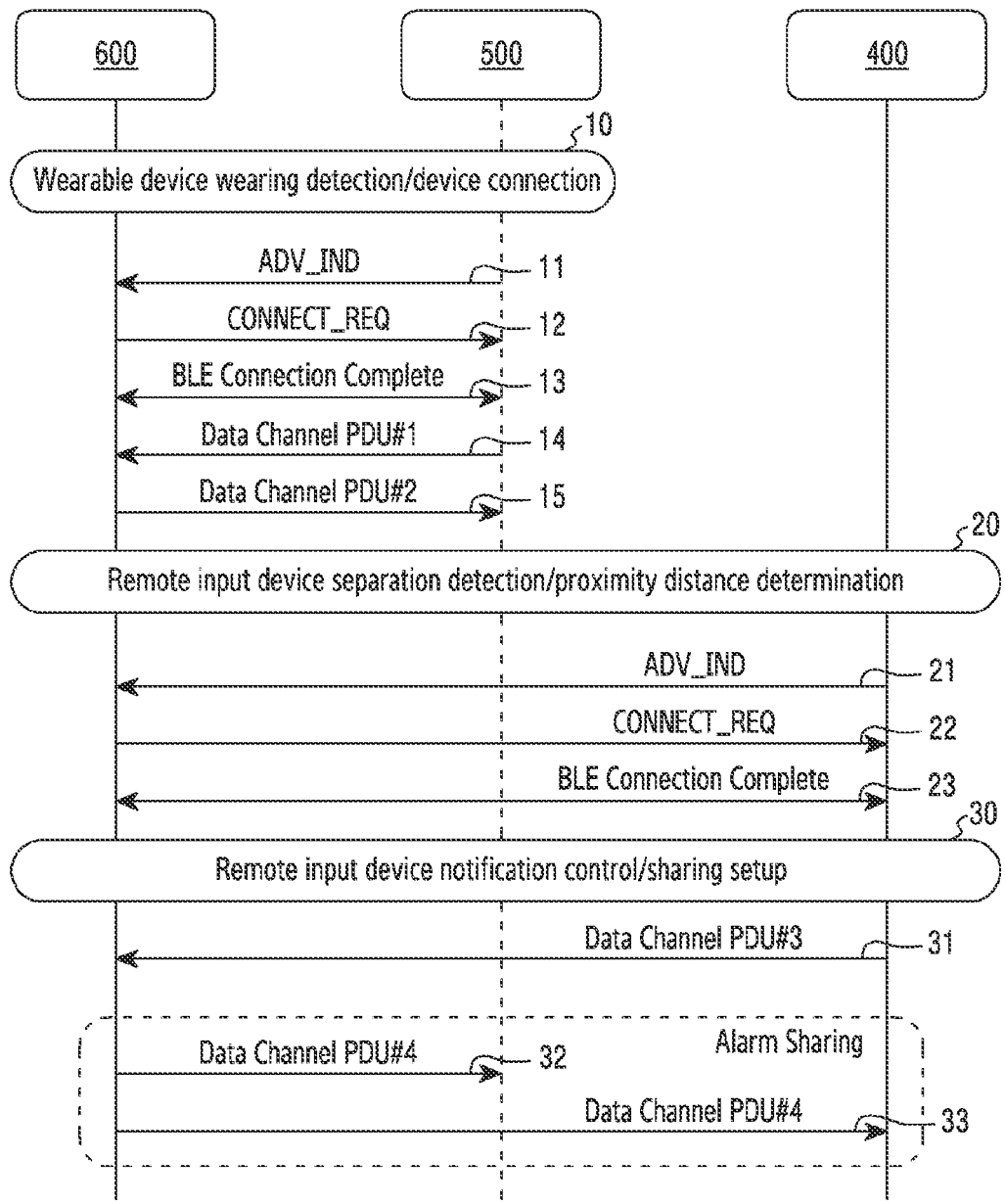
FIG. 8 is a flowchart illustrating a communication connection/notification sharing process (BLE advertising/connection) between an electronic device and a stylus and between the electronic device and a wearable device according to an embodiment of the disclosure.

FIG. 8 is a flowchart illustrating a communication connection/notification sharing process (BLE advertising/connection) between an electronic device and a stylus pen and between the electronic device and a wearable device according to an embodiment of the disclosure.

Figure 9A:
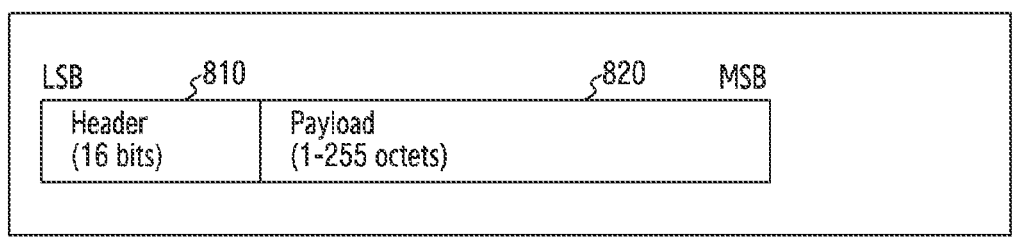
FIG. 9A illustrates an advertising channel Protocol Data Unit (PDU) according to an embodiment of the disclosure.

FIG. 9A illustrates an advertising channel protocol data unit (PDU) according to an embodiment of the disclosure.

Figure 9B:
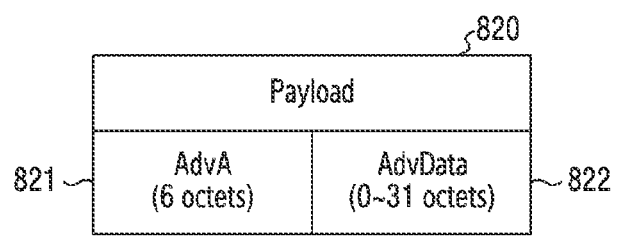
FIG. 9B illustrates an advertising PDU payload according to an embodiment of the disclosure.

FIG. 9B illustrates an advertising PDU payload according to an embodiment of the disclosure.

FIG. 9C illustrates an advertising packet according to an embodiment of the disclosure.

Referring to FIGS. 8, 9A, 9B, and 9C, in operation 10, the electronic device 600 may establish a communication connection with the wearable device 500.

In operation 11, the wearable device 500 may transmit an ADV_IND message (e.g., an active subscribe message) to the electronic device 600 to initiate a connection between the electronic device 600 and the wearable device 500.

In operation 12, the electronic device 600 may transmit a CONNECT_REQ message to the wearable device 500 in response to the received ADV_IND message, and thus may request the connection between the electronic device 600 and the wearable device 500.

In operation 13, the wearable device 500 may transmit a BLE connection complete message to the electronic device 600 in response to the received CONNECT_REQ message.

In operation 14, the wearable device 500 may transmit a data channel PDU #1 to the electronic device 600.

In operation 15, the electronic device 600 may transmit a data channel PDU #2 to the wearable device 500. Accordingly, a connection may be established between the electronic device 600 and the wearable device 500.

In operation 20, the electronic device 600 may detect that the stylus pen 400 is separated, and may determine a distance (e.g. proximity distance) to the stylus pen 400. The electronic device 600 may establish a BLE communication connection with the stylus pen 400.

In operation 21, the stylus pen 400 may transmit an ADV_IND message to the electronic device 600.

In operation 22, the electronic device 600 may transmit a CONNECT_REQ message to the stylus pen 400 in response to the received ADV_IND message.

In operation 23, the stylus pen 400 may transmit a BLE connection complete message to the electronic device 600.

In operation 30, the electronic device 600 may receive an input from the stylus pen 400, and may set notification sharing regarding an input result. The electronic device 600 may set notification sharing of the stylus pen 400. A user may select the wearable device 500 for displaying a notification of the stylus pen 400, or the electronic device 600 may automatically select the wearable device 500. For example, the electronic device 600 may determine a first distance between the electronic device 600 and the stylus pen 400, determined based on strength of a signal (e.g., a Received Signal Strength Indication (RSSI)) received from the stylus pen 400. The electronic device 600 may determine a second distance between the electronic device 600 and the wearable device 500, determined based on strength of a signal (e.g., an RSSI) received from the wearable device 500. When the first distance to the stylus pen 400 and the second distance to the wearable device 500 are within a designated range, the electronic device 600 may select the wearable device 500 as a device for displaying the notification of the stylus pen 400.

In operation 31, the stylus pen 400 may transmit a data channel PDU #3 to the electronic device 600.

In operation 32, the electronic device 600 may transmit a data channel PDU #4 to the wearable device 500. The electronic device 600 may transmit the data channel PDU #4 to the wearable device 500 so that a notification based on a distance value of the stylus pen 400 is provided in the wearable device 500.

In operation 33, the electronic device 600 may transmit the data channel PDU #4 to the stylus pen 400.

Through the operations 32 and 33, the electronic device 600 may control the notification of the stylus pen 400 or may set notification sharing.

The electronic device 600 may detect a separation of the stylus pen 400 through the first wireless charging coil 605 (see FIG. 6).

Upon detecting the separation of the stylus pen 400, the electronic device 600 may perform a BLE scanning operation through the antenna 665 (see FIG. 6) and the communication circuit 660 (see FIG. 6).

Orders of an operation of coupling the electronic device 600 and the stylus pen 400 and an operation of coupling the electronic device 600 and the wearable device 500 may be changed.

The electronic device 600 may receive a BLE advertising signal from the stylus pen 400. Referring to FIG. 9A, a BLE advertising signal 800 may include a header 810 and an advertising PDU payload 820.

Referring to FIG. 9B, the advertising PDU payload 820 may include an Advertising Address (AdvA) 821 and an Advertising Data (AdvData) 822.

Referring to FIG. 9C, the AdvData 822 may be configured in the form of an advertising packet 830. The advertising packet 830 may include flag data and manufacturer data information of an advertising device. In addition, manufacturing data may include Company Identifier (ID), Version, Service ID, and Service Specific Data information. The service ID may be used to define a service ID of a remote input device (e.g., a remote input device, a wristwatch-type wearable device, a wireless earphone device, etc.). The service specific data information (e.g., motion sensor information of the remote input device, heartrate sensor information and wearing detection sensor information of the wearable device) may be used to add service requirement information of the remote input device.

When the stylus pen 400 is detached (separated) from the electronic device 600, the electronic device 600 may receive a BLE advertising signal from the stylus pen 400. The electronic device 600 may be coupled for communication with the stylus pen 400, based on the received BLE advertising signal. The electronic device 600 may identify the stylus pen 400, based on a service ID of the received BLE advertising signal. The electronic device 600 may extract motion sensor information of the stylus pen 400 through service specific data information of the BLE advertising signal. The electronic device 600 may receive a data PDU including the motion sensor data in response to an input event of the stylus pen 400 while being coupled for communication with the stylus pen 400. In this case, the advertising PDU may be received only before being coupled for communication.

Figure 10:
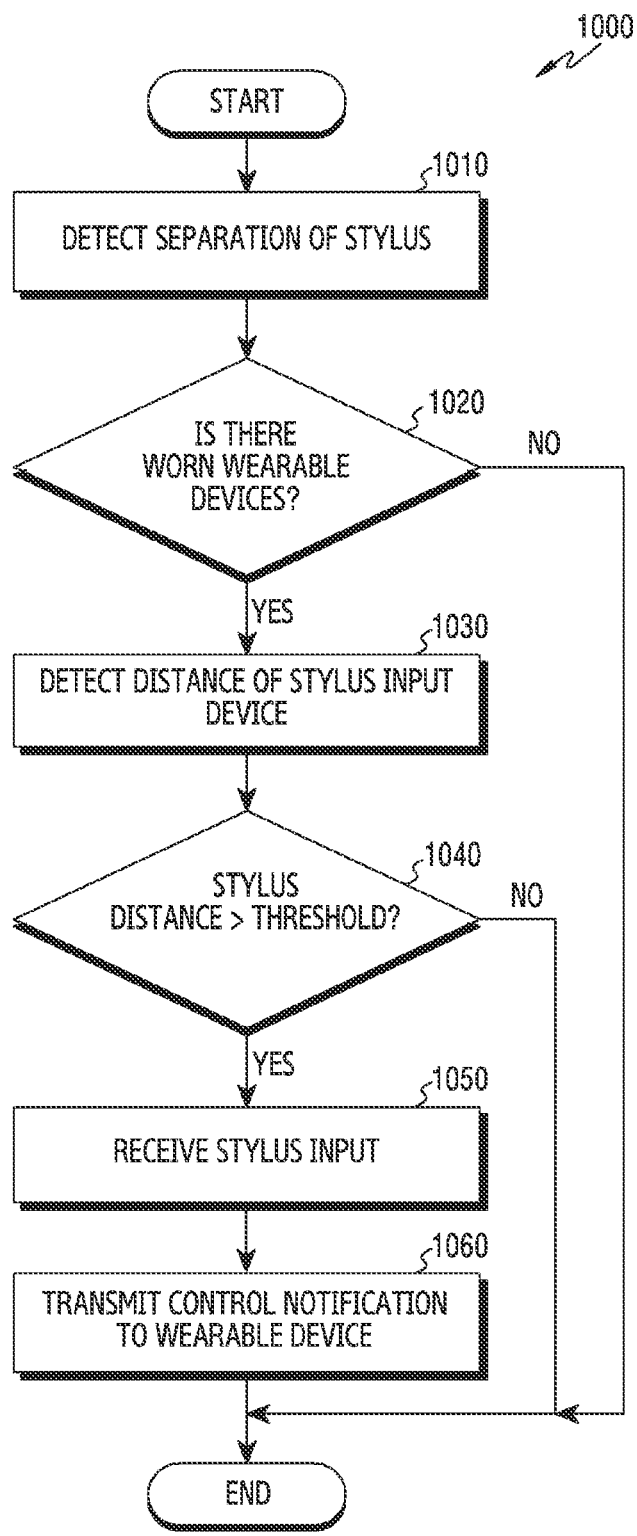
FIG. 10 is a flowchart illustrating a method of sharing a notification through a wearable device which is worn, in response to a remote control input of a stylus according to an embodiment of the disclosure.

FIG. 10 is a flowchart 1000 illustrating a method of sharing a notification through the wearable device which is worn, in response to a remote control input of the stylus pen according to an embodiment of the disclosure.

Referring to FIG. 10, in operation 1010, the electronic device 600 may detect a separation (or detachment) of the stylus pen 400.

Figure 11:
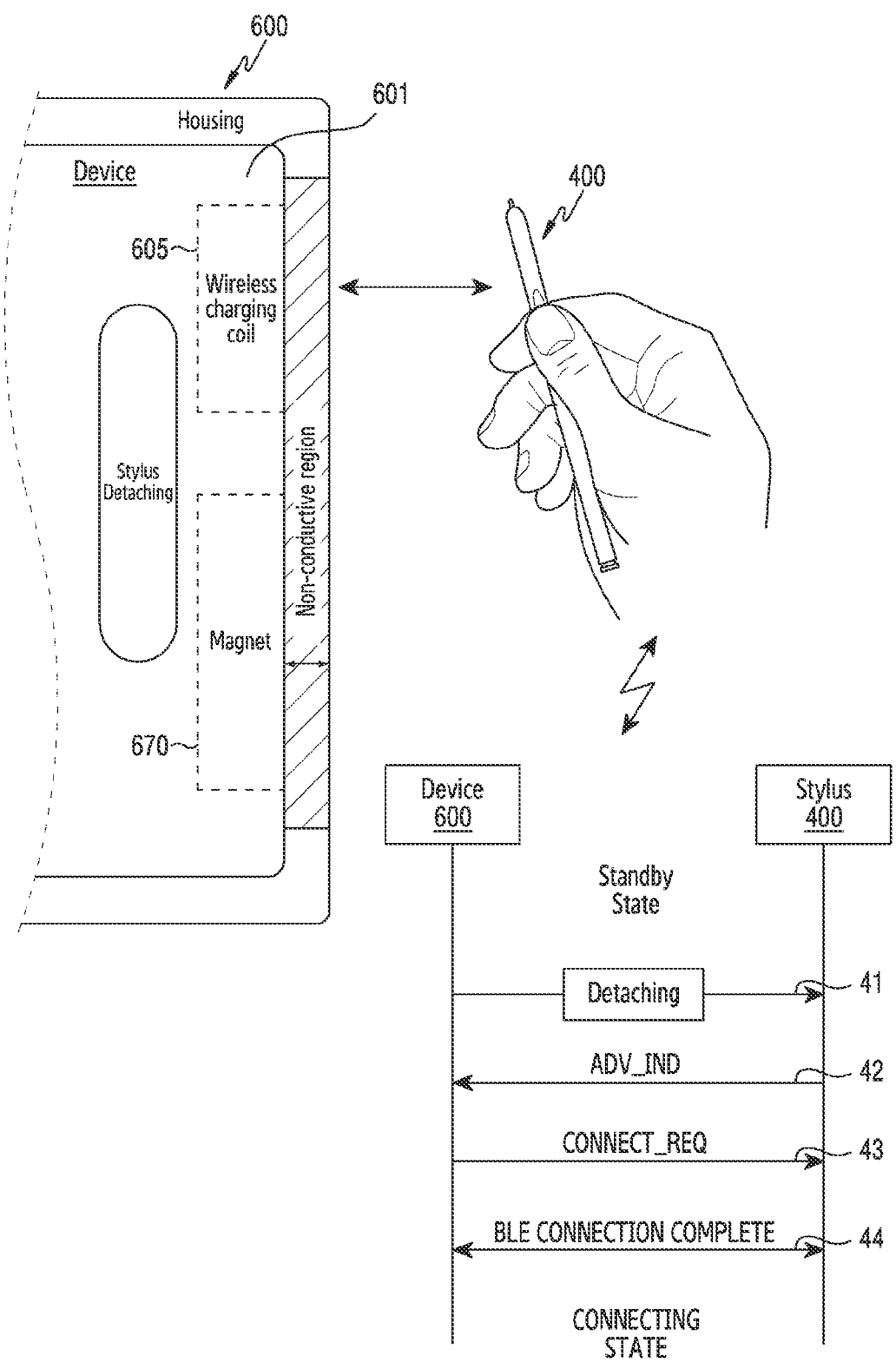
FIG. 11 illustrates a method of detecting a separation (or detachment) of a stylus and establishing a BLE connection of an electronic device and the stylus according to an embodiment of the disclosure.

FIG. 11 illustrates a method of detecting a separation (or detachment) of a stylus pen and establishing a BLE connection of an electronic device and the stylus pen according to an embodiment of the disclosure.

Referring to FIG. 11, in operation 41, the electronic device 600 may periodically detect a separated (or detached) state of the stylus pen 400. In this case, it may be assumed that the electronic device 600 and the stylus pen 400 have already completed a paring process.

When the stylus pen 400 is separated from a first wireless charging coil 605 (see FIG. 6) of the electronic device 600, an electric signal caused by an induced magnetic field is not received. The electronic device 600 may be changed to an initializing state, in response to a separation operation of the stylus pen 400.

In operation 42, the electronic device 600 may receive an advertising signal ADV_IND from the stylus pen 400.

In operation 43, the electronic device 600 may transmit a communication connection request signal to the stylus pen 400, in response to the received advertising signal ADV_IND.

In operation 44, the electronic device 600 may transition to a connecting state, in response to the received advertising signal ADV_IND.

The electronic device 600 may display a separation process and communication connection process of the stylus pen 400 on a screen through a notification message.

Referring back to FIG. 10, in operation 1020, the electronic device 600 may determine whether the wearable device 500 is being worn.

If it is determined in operation 1020 that there is no wearable device 500 being worn, the electronic device 600 may end the operation.

If it is determined in operation 1020 that a list of the wearable devices is identified and a wearable device 500 that can be coupled is present, the electronic device 600 may select the wearable device 500 for displaying a notification control. The electronic device 600 may connect communication with the stylus pen 400.

Figure 12:
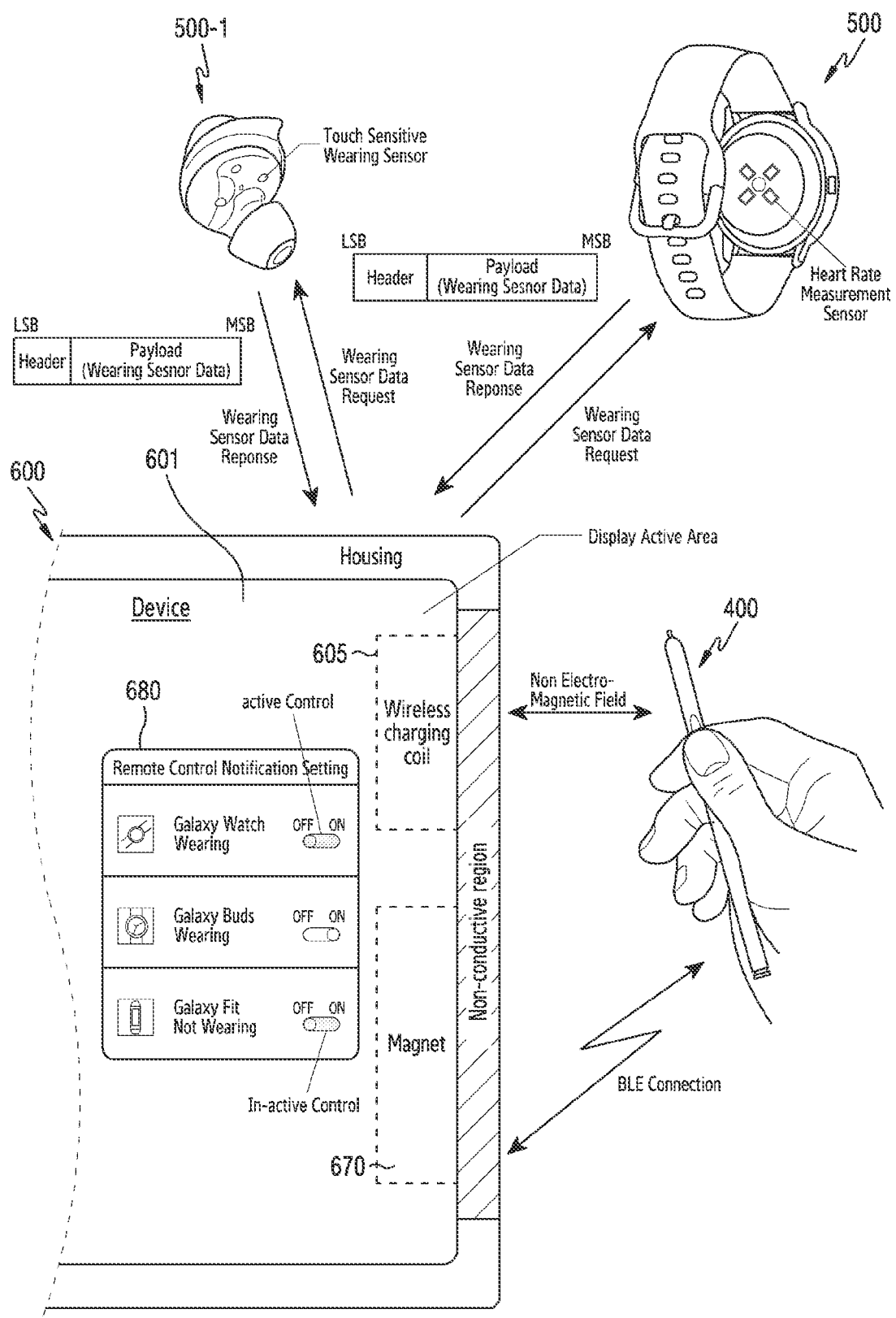
FIG. 12 illustrates a method of providing a notification control interface by using a wearable device according to an embodiment of the disclosure.

FIG. 12 illustrates a method of providing a notification control interface by using a wearable device according to an embodiment of the disclosure.

Referring to FIG. 12, an electronic device 600 may transmit a request message regarding wearing detection sensor data to neighboring wearable devices 500 and 500-1 which are wirelessly coupled (e.g., short-range communication such as Wi-Fi Aware or BLE) in response to a separation state of the stylus pen 400. Subsequently, the electronic device 600 may determine a wearable device which is worn by a user, in response to a response message received from the wirelessly coupled wearable devices 500 and 500-1. The electronic device 600 may provide a user interface 680 capable of selecting the wearable devices 500 and 500-1 for sharing a notification based on a distance to the stylus pen 400. In this case, the electronic device 600 may display notification control deactivation, through a display, for a wearable device which does not have a wearing detection sensor or which does not transmit wearing detection sensor data. The electronic device 600 may preferentially perform an operation of transmitting/receiving a request/response message, based on BLE communication.

As an example, the wireless coupled wearable devices 500 and 500-1 may include an optical wearing detection sensor. For example, the wristwatch-type wearable device 500 may include a HRM sensor employing infrared rays. The HRM sensor does not perform an HRM sensor measurement operation when in an unworn state, and may periodically measure a user's heart rate using the HRM sensor only when being worn. Accordingly, the wristwatch-type wearable device 500 may transmit a response message including HRM sensor data in response to a wearing detection sensor data request message of the electronic device 600. As another example, the wireless earphone device 500-1 may detect the worn state of the user by configuring a touch-sensitive wearing detection sensor adjacent to an ear tip.

The electronic device 600 may display a notification control interface through a display, in response to the separation state of the stylus pen 400. The electronic device 600 may display a list of the wirelessly coupled wearable devices through the notification control interface. The electronic device 600 may display the wearable device capable of controlling a notification distinctively (e.g., a worn/unworn state), by receiving the wearing detection sensor data of the wearable devices. The electronic device 600 may provide an active/inactive control button (e.g., an active control slide) for a list of wearable devices which are worn. Alternatively, the electronic device 600 may provide the control button only in an inactive state (e.g., an in-active control slide) for a list of wearable devices which are not worn.

When the user wears a plurality of wearable devices, one wearable device may be selected. For example, when the user wears the wristwatch-type device 500 and the earphone 500-1, the user may select a wearable device to be coupled. As another example, when the user wears the wristwatch-type device 500 and the earphone 500-1, the electronic device 600 may optionally select the wearable device, based on signal strength.

Referring back to FIG. 10, in operation 1030, the electronic device 600 may detect a distance to the stylus pen 400.

Figure 13:
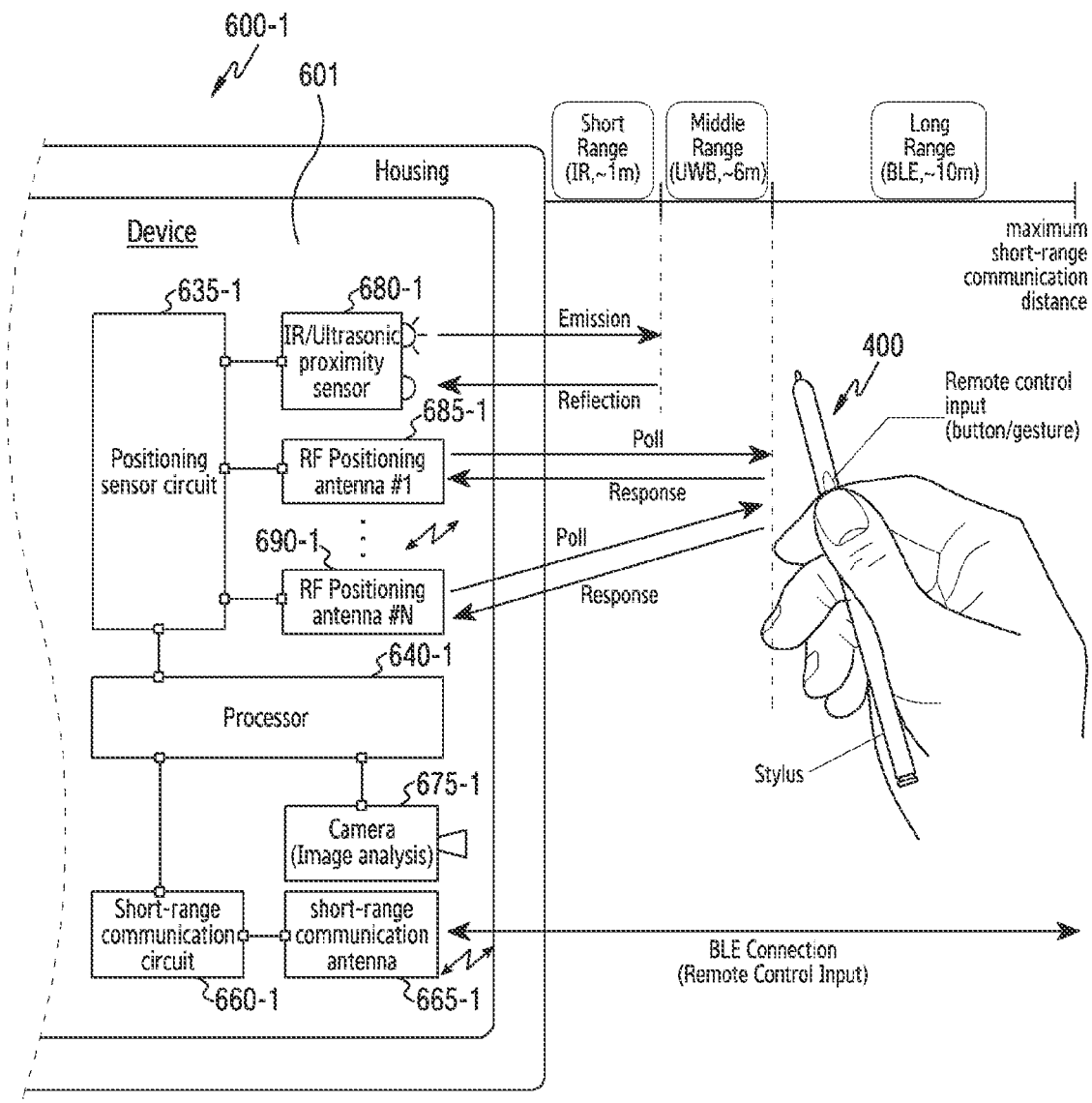
FIG. 13 illustrates a method of measuring a proximity distance between an electronic device and a stylus pen according to an embodiment of the disclosure.

FIG. 13 illustrates a method of measuring a proximity distance between an electronic device and a stylus pen according to an embodiment of the disclosure.

Referring to FIG. 13, an electronic device 600-1 (e.g., the electronic device 101 of FIG. 1) may include a processor 640-1 and a camera 675-1. The electronic device 600-1 may receive a remote control input (a button input) using a stylus pen 400, and measure a distance to the stylus pen 400.

The electronic device 600-1 may receive the remote control input, based on a motion of the stylus pen 400. The electronic device 600-1 may measure the distance to the stylus pen 400 in response to the remote control input. In this case, the electronic device 600-1 may measure the distance to the stylus pen 400 by using a positioning sensor circuit 635-1. The electronic device 600-1 may configure a plurality of input/output units (e.g., a proximity sensor and a positioning antenna) for measuring a plurality of proximity distance ranges together with the positioning sensor circuit 635-1.

The electronic device 600-1 may include an InfraRed (IR) sensor or ultrasonic sensor capable of detecting a short range (e.g., a distance within about 1 m) as the input/output unit. The electronic device 600-1 may emit an IR/ultrasonic signal to an object through the IR sensor or the ultrasonic sensor. The electronic device 600-1 may detect the stylus pen 400 within a short range (about 1 m), by measuring a time until a reflected IR/ultrasonic signal is received. For example, the electronic device 600-1 may emit the IR/ultrasonic signal in a direction of a display 601, and may receive the reflected IR/ultrasonic signal via an ultrasonic proximity sensor 680-1.

The electronic device 600-1 may include Radio Frequency (RF) input/output unit such as an Ultra-Wide Band (UWB) capable of detecting a middle range (e.g., within about 6 m). The RF input/output unit of the electronic device 600-1 may transmit/receive a poll signal to the stylus pen 400 through positioning antennas 685-1 and 690-1. The electronic device 600-1 may detect the stylus pen 400 within the middle rage (about 6 m), by receiving a response signal from the stylus pen 400 in response to the poll signal. As such, the electronic device 600-1 may calculate a difference between a poll signal transmission time and a response signal reception time to determine a proximity distance.

The electronic device 600-1 may include a plurality of UWB antennas. The stylus pen 400 may include one UWB antenna. The electronic device 600-1 may determine a direction and distance to the stylus pen 400, by receiving a UWB signal of the stylus pen 400 through the plurality of UWB antennas. Since the stylus pen 400 does not need to determine the direction of the electronic device 600-1, one UWB antenna may be included to determine only the distance to the electronic device 600-1.

The electronic device 600-1 may determine a proximity direction and proximity distance to the stylus pen 400 by using respective poll signals and response signals transmitted/received through the plurality of positioning antennas.

The electronic device 600-1 may detect the stylus pen 400 within a long range (e.g., a maximum short-range communication distance, such as about 10 m) in response to a connecting state of a short-range communication circuit. In this case, the electronic device 600-1 may detect a proximity state of the stylus pen 400 to recognize how far away the stylus pen 400 is.

When the stylus pen 400 is out of a maximum communication distance from the electronic device 600-1, the electronic device 600-1 may release a short-range communication connecting state (e.g., BLE) via the short-range communication circuit 660-1 and the short-range communication antenna 665-1. In addition, the electronic device 600-1 may transition to a stand-by state.

The electronic device 600-1 may transition from the stand-by state to the short-range communication connecting state. In this case, the electronic device 600-1 may detect a proximity state of the stylus pen 400 within a long range (about 10 m).

In addition, the electronic device 600-1 may detect a precise proximity distance (e.g., a short/middle range) to the stylus pen 400 through a positioning sensor circuit, in response to the transition of the short-range communication connecting state. The electronic device 600-1 may periodically transmit a proximity sensing signal (e.g., a poll signal) to the stylus pen 400 through the positioning sensor circuit. In addition, the electronic device 600-1 may receive a proximity sensing response signal (e.g., a response signal) from the stylus pen 400.

Referring back to FIG. 10, in operation 1040, the electronic device 600 may determine whether a distance value with respect to the stylus pen 400 exceeds a pre-set threshold (e.g., about 1 m), based on a distance value with respect to the stylus pen 400.

If it is determined in operation 1040 that the distance value with respect to the stylus pen 400 does not exceed the pre-set threshold, then the electronic device 600 may not perform an additional notification operation.

If it is determined in operation 1040 that the distance value with respect to the stylus pen 400 exceeds the pre-set threshold, then in operation 1050, the electronic device 600 may receive an input of the stylus pen 400. In operation 1060, the electronic device 600 may transmit to the wearable device 500 a control notification for the input received from the stylus pen 400. For example, the control notification may be a feedback for the received input. In operation 1060, the electronic device 600 may transmit to the wearable device 500 the control notification indicating that the distance with respect to the stylus pen 400 exceeds the pre-set threshold.

The order of the operations shown in FIG. 10 may be changed. For example, if the input is received from the stylus pen 400 in operation 1050, the electronic device 600 may measure the distance between the stylus pen 400 and the electronic device 600 in operation 1030.

Figure 14:
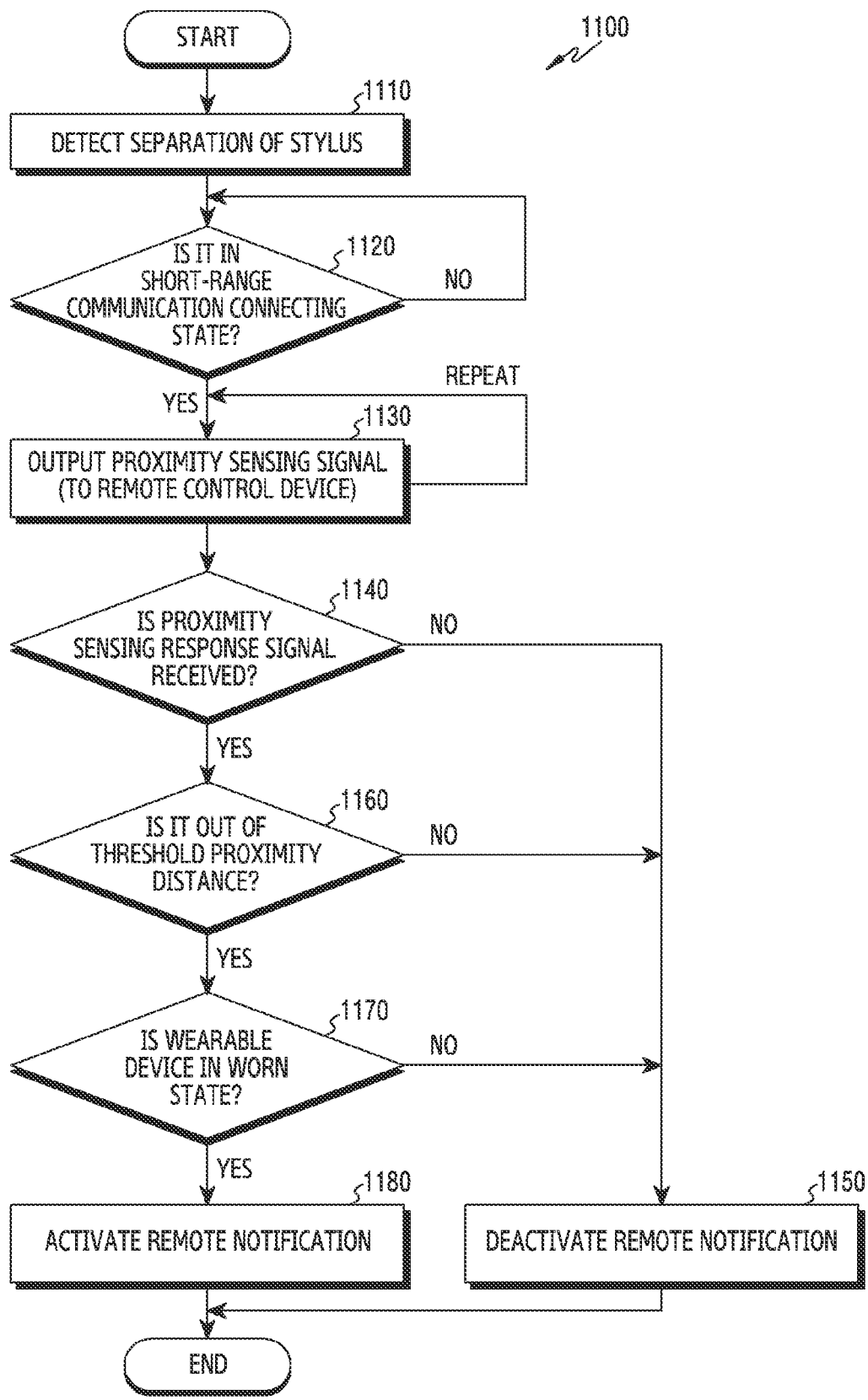
FIG. 14 illustrates a method of activating a remote notification based on a proximity distance of a stylus pen when a distance between an electronic device and the stylus pen is a communicable proximity distance according to an embodiment of the disclosure.

FIG. 14 is an operational diagram 1100 illustrating a method of activating a remote notification based on a proximity distance of a stylus pen 400 when a distance between an electronic device (e.g., the electronic device 600-1 of FIG. 13) and the stylus pen (e.g., the stylus pen 400 of FIG. 13) is within a communication range according to an embodiment of the disclosure.

Referring to FIGS. 13 and 14, in operation 1110, the electronic device 600-1 may detect a separation of the stylus pen 400.

In operation 1120, the electronic device 600-1 may determine whether it is in a short-range communication (e.g., Bluetooth communication or ultra-wideband communication) connecting state with respect to the stylus pen 400.

When in the short-range communication connecting state with respect to the stylus pen 400, in operation 1130, the electronic device 600-1 may output a proximity sensing signal (e.g., an advertising signal or a POLL signal) to the stylus pen 400.

In operation 1140, the electronic device 600-1 may determine whether a proximity sensing response signal (e.g., a response signal) for the proximity sensing signal is received from the stylus pen 400.

If it is determined in operation 1140 that the proximity sensing response signal is not received from the stylus pen 400, then in operation 1150, the electronic device 600-1 may deactivate a remote notification.

If it is determined in operation 1140 that the proximity sensing response signal is received from the stylus pen 400, then in operation 1160, the electronic device 600-1 may determine whether the stylus pen 400 is out of a pre-set threshold proximity distance (e.g., about 1 m). The threshold proximity distance may be a distance (e.g., about 1 m) that can be detected by using an infrared sensor or an ultrasonic sensor.

If it is determined in operation 1160 that the electronic device 600-1 is not out of the pre-set threshold, then in operation 1150, the electronic device 600-1 may deactivate the remote notification.

If it is determined in operation 1160 that the stylus pen 400 is out of the pre-set threshold proximity distance, then in operation 1170, the electronic device 600-1 may determine whether the wearable device 500 is in a worn state.

If it is determined in operation 1170 that the wearable device 500 is not in the worn state, then in operation 1150, the electronic device 600-1 may deactivate the remote notification.

If it is determined in operation 1170 that the wearable device 500 is in the worn state, then in operation 1180, the electronic device 600-1 may activate the remote notification.

As such, since the stylus pen 400 might not have output elements, the stylus pen 400 may not be able to provide a notification indicating that the stylus pen 400 is out of a maximum communication distance. When the stylus pen 400 is out of a threshold proximity distance (a distance that is difficult for the user to recognize in a visual/auditory manner), an appropriate notification may be provided to the user through the wearable device 500. In some cases, the maximum communication distance between the electronic device 600 and the wearable device 500 may be longer than the maximum communication distance between the stylus pen 400 and the electronic device 600. For example, communication performance (e.g., signal transmit power or a signal transmission distance) of the wearable device 500 may be better than communication performance of the stylus pen 400. As another example, the wearable device 500 may include a communication circuit (e.g., Wi-Fi) supporting a longer distance than the stylus pen 400. When a remote notification is activated and a signal cannot be received from the stylus pen 400 or the signal is lower than a threshold value, the electronic device 600 may notify the wearable device 500 that the stylus pen 400 is out of a maximum communication distance.

Figure 15:
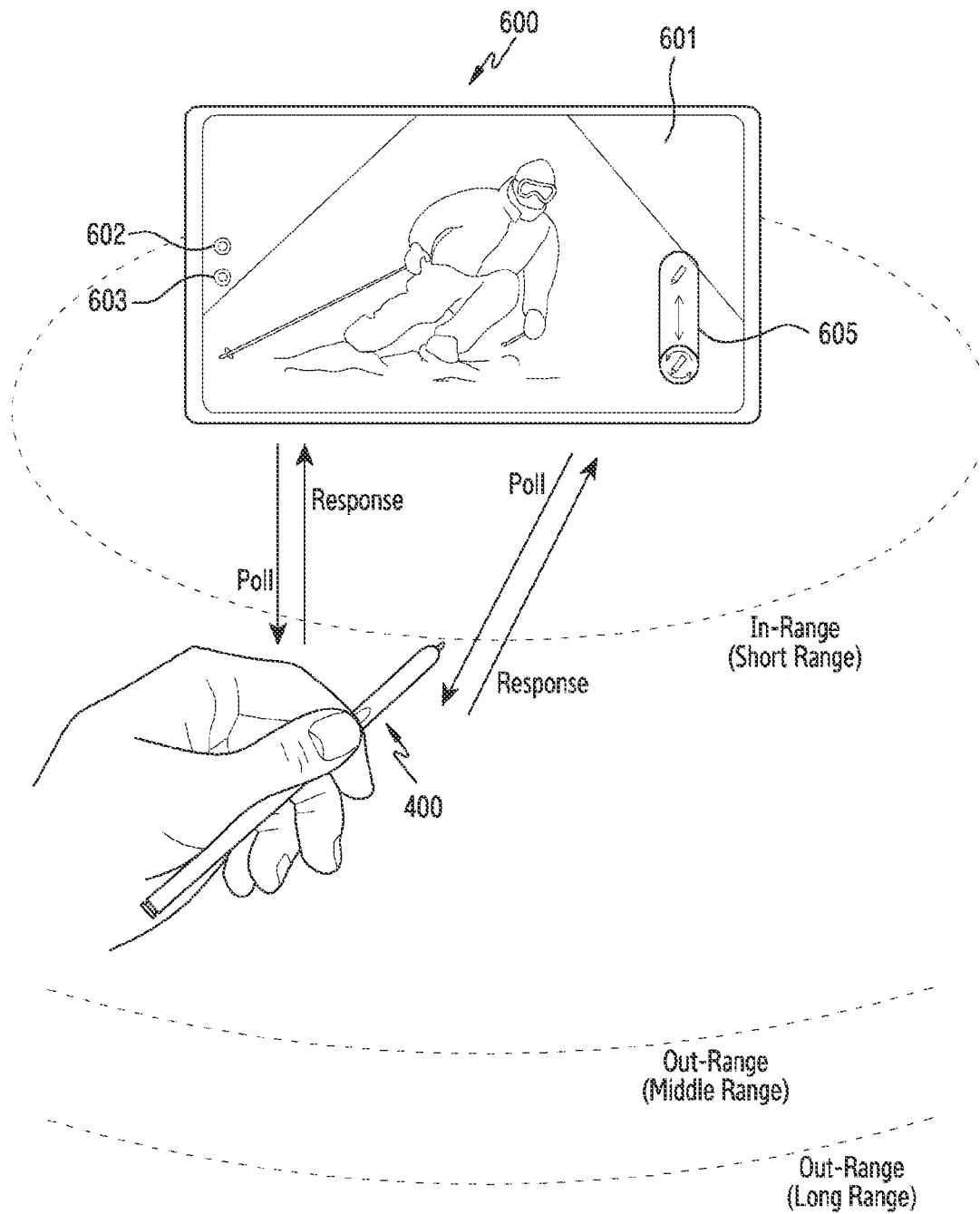
FIG. 15 illustrates a method of providing a remote notification interface based on a proximity distance when a distance between an electronic device and a stylus is a proximity distance according to an embodiment of the disclosure.

FIG. 15 illustrates a method of providing a remote notification interface based on a proximity distance when a distance between an electronic device and a stylus pen is a proximity distance according to an embodiment of the disclosure.

Referring to FIG. 15, the electronic device 600 may provide a remote notification interface in response to a separation (or detach) operation of the stylus pen 400. The electronic device 600 may provide a remote notification interface 606 in response to the proximity distance of the stylus pen 400, determined through a positioning sensor circuit. In this case, the electronic device 600 may activate a remote notification function using a wearable device 500 through the remote notification interface 606. The electronic device 600 may deactivate the remote notification function using the wearable device 500 through the remote notification interface 606 while the stylus pen 400 is within the proximity distance. When activating the remote notification function, a user may directly select the wearable device 500 for displaying a notification of the stylus pen 400, or the electronic device 600 may automatically select the wearable device 500.

The electronic device 600 may activate a remote notification function using the wearable device 500 in response to a threshold proximity state (e.g., within a short range) of the stylus pen 400 and a worn state of the wearable device 500. In this case, the electronic device 600 may display the activation of the remote notification function by using a display 601.

Even if the stylus pen 400 is out of the threshold proximity distance from the electronic device 600, the electronic device 600 may deactivate the remote notification function when the user is not wearing a wearable device. In this case, the electronic device 600 may display the deactivation of the remote notification function by using the display 601.

The electronic device 600 may allow the remote notification interface to transition to a hidden state, where there is no remote control input of the stylus pen 400 or no motion (e.g., motion sensor data) of the stylus pen 400 during a pre-set specific time. On the other hand, upon detecting the motion of the stylus pen 400 within the pre-set specific time, the electronic device 600 may provide the remote notification interface using the wearable device 500.

The electronic device 600 may activate a first camera 602 and a second camera 603, in response to the separation operation or motion of the stylus pen 400. The electronic device 600 may activate the first camera 602 and the second camera 603 to analyze an image, thereby identifying the motion of the stylus pen 400. The electronic device 600 may provide the remote notification interface in response to a result obtained by identifying the stylus pen 400 through the analysis of the captured image.

The electronic device 600 may identify the stylus pen 400 and a user who carries the stylus pen 400 through the analysis of the captured image. In this case, the electronic device 600 may analyze the captured image by using a pre-set housing shape (e.g., a stylus exterior shape) of the stylus pen 400 and color information (e.g., red or blue).

Upon identifying the stylus pen 400 and the user who carries the stylus pen 400 through the analysis of the captured image, the electronic device 600 may determine that the stylus pen 400 is located within a pre-set threshold distance, and may determine that the stylus pen 400 is in a threshold proximity state.

If the electronic device 600 is unable to identify the stylus pen 400 from the captured image, the electronic device 600 may determine that the stylus pen 400 is in a state of being out of the threshold proximity distance.

Figure 16:
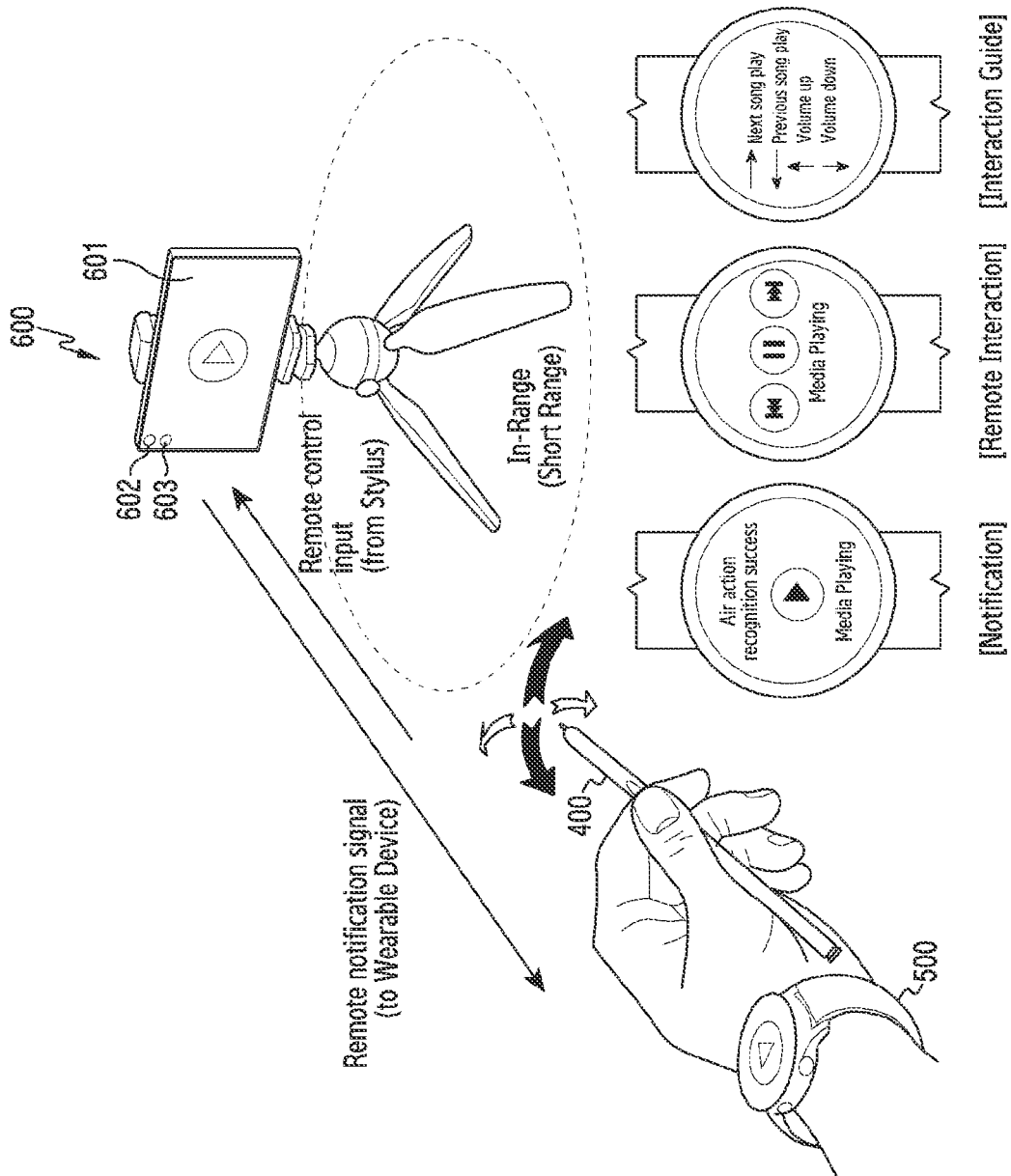
FIG. 16 illustrates a method of providing a remote notification in response to a remote control input of a stylus according to an embodiment of the disclosure.

FIG. 16 illustrates a method of providing a remote notification in response to a remote control input of a stylus pen 400 according to an embodiment of the disclosure.

Referring to FIG. 16, an electronic device 600 may determine a wearable device 500 (e.g., a worn wearable device) in which a remote notification is activated in response to a remote control input (e.g., a button input/gesture input) of the stylus pen 400. The electronic device 600 may transmit a remote notification signal to the wearable device 500. The wearable device 500 may receive the remote notification signal (e.g., a response signal) from the electronic device 600. The remote notification signal may be a response signal from the electronic device 600. The worn wearable device 500 may provide the remote notification depending on a distance of the stylus pen 400 in response to the remote notification signal which is input from the electronic device 600. For example, the electronic device 600 may transmit to the wearable device 500 the remote notification signal including a notification message, remote interaction information, or interaction guide information.

The electronic device 600 may provide the remote notification signal including recognition success/failure information for the remote control input, recognized remote control input information, and/or indicator information corresponding to the recognized remote control input.

The electronic device 600 may provide the remote notification signal including linked interaction information related to the recognized remote control input. For example, when the recognized remote control input is "Media Playing", the electronic device 600 may provide the remote notification signal including the linked interaction information related to the input "Media Playing" such as a media play stop, a forward play, a backward play, a play after 10 seconds, or a play before 10 seconds. The wearable device 500 may provide play/stop, forward, and backward icons. A user may directly touch the play/stop, forward, and backward icons of the wearable device 500 to provide a control thereof.

As an example, the electronic device 600 may provide the remote notification signal including the interaction guide information through the wearable device 500, in relation to the recognized remote control input. The electronic device 600 may provide the remote notification signal including the interaction guide information related to an application which is currently executed. When the application currently executed by the electronic device 600 is a media player, the interaction guide information may include gesture guide information for a next song play, a previous song play, a volume up, or a volume down. When the application currently executed is a camera capture, the electronic device 600 may provide gesture guide information for a zoom-in/zoom-out, a selfie/rear camera change, or a camera mode change.

The electronic device 600 may provide the remote notification signal including haptic and sound effect information, not notification information for displaying a screen to the wearable device 500 which is worn. For example, the electronic device 600 may provide a haptic effect (e.g., a motor vibration) through the wearable device 500 (e.g., a wristwatch-type wearable device or a wireless earphone device) that the user is wearing, in response to the remote notification signal. As another example, the electronic device 600 may provide a sound effect (e.g., beep) through the wearable device 500 which is worn, in response to the remote notification signal. In this case, the remote notification signal may control a haptic pattern and a sound effect type so as to be distinguished from a general event notification (e.g., a push message).

Figure 17:
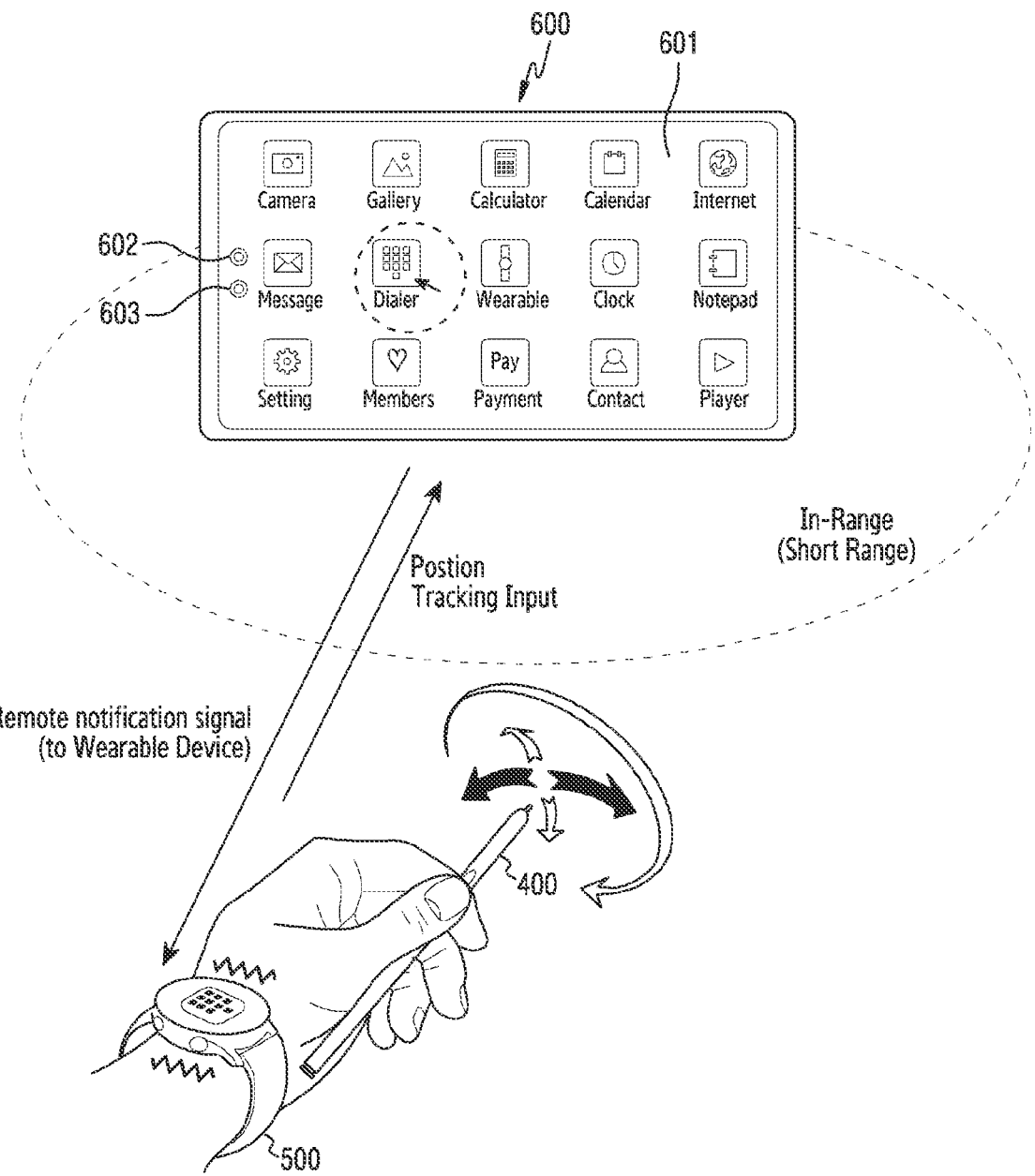
FIG. 17 illustrates a method of driving a remote coordinate control mode (e.g., an air mouse mode) of a stylus according to an embodiment of the disclosure.

FIG. 17 illustrates a method of driving a remote coordinate control mode (e.g., an air mouse mode) of a stylus according to an embodiment of the disclosure.

Referring to FIG. 17, when an application function is performed, an electronic device 600 may provide not only a remote control input mode (e.g., an air action mode) but also a remote coordinate control mode (e.g., an air mouse mode). The electronic device 600 may provide the remote coordinate control mode (e.g., the air mouse mode) in response to motion data (e.g., motion sensor data) received from the stylus pen 400. The air mouse mode may operate like a mouse, after a long-press input of a button (a released state). The air action mode (e.g., the gesture mode) may operate by inputting a gesture in a state where a button is pressed hard (a pressed state). Other mechanisms for activating the air action mode and the air mouse mode may also be employed.

The electronic device 600 may provide a remote notification signal to a wearable device 500 in response to at least one remote control input in the remote control input mode.

When an indicator (e.g., a mouse cursor) is located on a remotely selectable object (e.g., an application execution object) in the remote coordinate control mode, the electronic device 600 may provide a first haptic vibration while displaying the remotely selectable object in which the indicator (e.g., the mouse cursor) is located through the wearable device 500 which is worn.

The electronic device 600 may provide a second haptic vibration in response to a button/gesture input for selecting the remotely selectable object. In this case, the electronic device 600 may provide the wearable device 500 with a remote notification signal including vibration patterns which are different for the first haptic vibration and the second haptic vibration.

The electronic device 600 may provide a coordinate of a specific view region as a remote notification signal, based on the indicator (e.g., the mouse cursor) in the remote coordinate control mode. In this case, the electronic device 600 may display only a specific screen region corresponding to the coordinate of the specific view region of the entire screen image through the worn wearable device 500 in the remote coordinate control mode. For example, the remote coordinate control mode may include a HOME screen, an APPS screen displaying an array of icons, or an application execution screen.

According to various embodiments of the disclosure, the electronic device 600 and a method of providing a user with a notification based on a distance of the remote input device 400 (e.g., the stylus pen) by using the wearable device 500 may be provided. A user feedback may be provided for a remote control input of the remote input device 400 (e.g., the stylus pen). In addition, a notification may be provided through a wearable device which is worn. In addition, a persistent remote control may be achieved by guiding the remote input device 400 (e.g., a stylus pen) to be located within a communicable distance of the electronic device 600.

When the user executes a camera application and captures an image through the stylus pen 400, the electronic device 600 may analyze the captured image and provide the user with a feedback for a result of the capturing through the wearable device 500. The feedback may include information on an object to be captured, and for example, may include a feedback indicating that re-capturing is required since a subject closes eyes. As another example, when a remote control of the remote input device 400 (e.g., the stylus pen) is performed, the electronic device 600 may transfer status information (e.g., remaining battery power) or the remote input device 400 through the wearable device 500.

The electronic device 600 may include a communication circuit 660, an antenna 665, a wireless charging coil 605, a positioning sensor circuit 635, and a processor 640. The communication circuit 660 may connect communication with the remote input device 400 and the wearable device 500. The antenna 665 may transmit/receive a signal between the remote input device 400 and the wearable device 500. The wireless charging coil 605 may detect an attachment and detachment of the remote input device 400 and transmit/receive an electromagnetic signal to the remote input device 400. The positioning sensor circuit 635 may measure a distance to the remote input device 400. The processor 640 may determine the attachment and detachment of the remote input device 400, based on the electromagnetic signal, and may recognize a distance to the remote input device 400. The processor 640 may provide the wearable device 500 with a remote notification signal based on the distance to the remote input device 400.

The processor 640 of the electronic device 600 may determine whether the wearable device 500 is in a worn state if the distance to the remote input device 400 exceeds a pre-set threshold distance, and may activate a remote notification using the wearable device 500 if the wearable device 500 is in the worn state.

The electronic device 600 may include a display 601, and may display a notification control interface through the display 601 in response to a separation state of the remote input device 400.

The electronic device 600 may display a list of the wirelessly coupled wearable devices 500 through the notification control interface. The wearable device 500 capable of the remote notification may be displayed by receiving wearing detection sensor data of the wearable devices 500.

If the distance to the remote input device 400 exceeds the pre-set threshold distance, the electronic device 600 may display the notification control interface to notify that the distance exceeds the threshold distance.

The electronic device 600 may include one or more cameras 602 and 603 capturing an image by using the remote input device 400 to generate an image signal. The processor 640 may analyze the image signal to measure the distance to the remote input device 400, and may recognize a motion of the remote input device 400.

If the remote input device 400 is identified as a result of analyzing the image signal, the electronic device 600 may determine that the remote input device 400 is located within the threshold distance. If the remote input device is not identified, it then the remote input device 400 may be determined to be out of the threshold distance.

If the remote input device 400 is located within a pre-set threshold distance, the electronic device 600 may deactivate the remote notification using the wearable device 500.

The electronic device 600 may further include an infrared sensor (e.g., the sensor module 176 of FIG. 1) emitting an infrared ray. The infrared ray reflected from the remote input device 400 may be received to measure a distance to the remote input device 400.

The electronic device 600 may further include an ultrasonic sensor (e.g., the sensor module 176 of FIG. 1) emitting an ultrasonic wave. The ultrasonic wave reflected from the remote input device 400 may be received to measure a distance to the remote input device 400.

The electronic device 600 may further include a Radio Frequency (RF) input/output unit which outputs an Ultra-Wide Band (UWB) signal. The UWB signal reflected from the remote input device 400 may be received to measure a distance to the remote input device.

According to various embodiments of the disclosure, a method of operating the electronic device 600 and providing a notification, based on a distance of the remote input device 400 may connect communication with the remote input device and the wearable device 500 is provided. An electromagnetic signal may be transmitted/received with respect to the remote input device 400. An attachment and detachment of the remote input device 400 may be detected, based on the electromagnetic signal. A distance to the remote input device 400 may be measured. A remote notification signal based on the distance to the remote input device 400 may be provided to the wearable device 500.

The method of providing the notification, based on the distance to the remote input device 400, may include determining whether the wearable device 500 is in a worn state if the distance to the remote input device 400 exceeds a pre-set threshold distance. A remote notification using the wearable device 500 may be activated if the wearable device 500 is in the worn state.

The method of providing the notification, based on the distance to the remote input device 400, may include displaying a notification control interface through the display 601 of the electronic device 600 in response to a separation state of the remote input device 400. A list of wearable devices 500 wirelessly coupled to the electronic device may be displayed through the notification control interface. Wearing detection sensor data of the wearable devices 500 may be received to display the wearable device 500 capable of remote notification.

The method of providing the notification based on the distance to the remote input device 400 may include displaying a notification control interface to notify that the distance exceeds the threshold distance, if the distance to the remote input device 400 exceeds the pre-set threshold distance.

The method of providing the notification based on the distance to the remote input device 400 may include capturing an image by using the remote input device 400 to generate an image signal. The image signal may be analyzed to measure the distance to the remote input device 400 and recognize a motion of the remote input device 400.

The method of providing the notification based on the distance to the remote input device 400 may include determining that the remote input device 400 is located within the threshold distance if the remote input device 400 is identified as a result of analyzing the image signal. It may be determined that the remote input device 400 is out of the threshold distance if the remote input device is not identified.

In the method of providing the notification based on the distance to the remote input device 400, the notification control information may include a notification message, remote interaction information, interaction guide information, recognition success information on the remote control input, recognition failure information on the remote control input, recognized remote control input information, and indicator information corresponding to the recognized remote control input.

In the method of providing the notification based on the distance to the remote input device 400, the electronic device 600 may provide a remote control input mode for application execution.

In the method of providing the notification based on the distance to the remote input device 400, the electronic device 600 may provide the remote coordinate control mode corresponding to motion data received from the remote input device.

The method of providing the notification based on the distance to the remote input device 400 may use the wearable device 500 to display the remotely selectable object and provide a haptic vibration, if a mouse cursor is located on a remotely selectable object in the remote coordinate control mode.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuit configured to communicate with a remote input device and a wearable device;
an antenna configured to transmit and receive signals with respect to the remote input device and the wearable device;
a wireless charging coil configured to:
  detect an attachment and detachment of the remote input device, and
  transmit/receive an electromagnetic signal with respect to the remote input device;
a positioning sensor circuit configured to measure a distance to the remote input device; and
a processor configured to:
  determine an attachment and detachment of the remote input device, based on the electromagnetic signal,
  recognize the distance to the remote input device,
  determine whether the wearable device is in a worn state if the distance to the remote input device exceeds a pre-set threshold distance,
  activate a remote notification using the wearable device if the wearable device is in the worn state, and
  provide the wearable device with a remote notification signal.

2. The electronic device of claim 1, further comprising:
a display,
wherein a notification control interface is displayed through the display in response to a separation state of the remote input device,
wherein a list of wearable devices wirelessly coupled to the electronic device is displayed through the notification control interface, and
wherein wearing detection sensor data of the wearable devices is received to display the wearable device capable of remote notification.

3. The electronic device of claim 2, wherein if the distance to the remote input device exceeds the pre-set threshold distance, a notification control interface is displayed notifying that the distance exceeds the threshold distance.

4. The electronic device of claim 3, further comprising:
one or more cameras configured to generate an image signal by using the remote input device,
wherein the processor is further configured to:
  analyze the image signal to measure the distance to the remote input device, and
  recognize a motion of the remote input device.

5. The electronic device of claim 4,
wherein if the remote input device is identified as a result of analyzing the image signal, it is determined that the remote input device is located within the threshold distance, and
wherein if the remote input device is not identified, it is determined that the remote input device is out of the threshold distance.

6. The electronic device of claim 1, wherein if the remote input device is located within the pre-set threshold distance, the remote notification using the wearable device is deactivated.

7. The electronic device of claim 1, further comprising:
an infrared sensor configured to emit an infrared ray,
wherein the infrared ray reflected from the remote input device is received to enable measurement of a distance to the remote input device.

8. The electronic device of claim 1, further comprising:
an ultrasonic sensor configured to emit an ultrasonic wave, wherein the ultrasonic wave reflected from the remote input device is received to measure a distance to the remote input device.

9. The electronic device of claim 1, further comprising:
a Radio Frequency (RF) input/output unit configured to output an Ultra-Wide Band (UWB) signal,
wherein the UWB signal reflected from the remote input device is received so as to enable measurement of a distance to the remote input device.

10. A method of operating an electronic device and providing a notification, based on a distance between the electronic device and a remote input device, the method comprising:
establishing a communication with the remote input device and a wearable device;
transmitting/receiving an electromagnetic signal with respect to the remote input device via a wireless charging coil of the electronic device;
detecting, via the wireless charging coil of the electronic device, an attachment and detachment of the remote input device, based on the electromagnetic signal;
measuring, via a positioning sensor circuit of the electronic device, the distance between the electronic device and the remote input device;
determining whether the wearabale device is in a worn state if the distance to the remote input device exceeds a pre-set threshold distance;
activating a remote notification using the wearable device if the wearable device is in the worn state; and
providing the wearable device with a remote notification signal, via a communication circuit of the electronic device, based on the distance between the electronic device and the remote input device.

11. The method of claim 10,
wherein a notification control interface is displayed through a display of the electronic device in response to a separation state of the remote input device,
wherein a list of wearable devices wirelessly coupled is displayed through the notification control interface, and
wherein wearing detection sensor data of the wearable devices is received to display the wearable device capable of remote notification.

12. The method of claim 10, wherein if the distance to the remote input device exceeds the pre-set threshold distance, a notification control interface is displayed to notify that the distance exceeds the threshold distance.

13. The method of claim 12,
wherein an image signal is generated by using the remote input device, and
wherein the image signal is analyzed to measure the distance to the remote input device and recognize a motion of the remote input device.

14. The method of claim 13,
wherein if the remote input device is identified as a result of analyzing the image signal, it is determined that the remote input device is located within the threshold distance, and
wherein if the remote input device is not identified, it is determined that the remote input device is out of the threshold distance.

15. The method of claim 13, wherein the remote notification signal includes at least one of a notification message, remote interaction information, interaction guide information, recognition success information on the remote control input, recognition failure information on the remote control input, recognized remote control input information, and indicator information corresponding to the recognized remote control input.

16. The method of claim 15, wherein the electronic device provides a remote control input mode for application execution or a remote coordinate control mode corresponding to motion data received from the remote input device.

17. The method of claim 10, further comprising releasing a communication connection and transitioning to a standby state in case that the distance to the remote input device is greater than a maximum communication range,
wherein the remote notification signal includes instructions for the remote input device to provide at least one haptic vibration.

18. The method of claim 10, further comprising:
receiving a remote control input from the remote input device,
wherein the providing of the wearable device with the remote notification signal comprises:
generating the remote notification signal based on the remote control input, and
providing the wearable device with the remote notification signal based on the distance to the remote input device.

* * * * *